United States Patent
Corey

(10) Patent No.: US 10,335,712 B2
(45) Date of Patent: Jul. 2, 2019

(54) METHOD USING PRESSURE GRADIENT PROFILING IN AN EXTRACTION COLUMN

(71) Applicant: California Extraction Ventures, Inc., Newport Beach, CA (US)

(72) Inventor: Stephen Corey, Newport Beach, CA (US)

( * ) Notice: Subject to any disclaimer, the term of this patent is extended or adjusted under 35 U.S.C. 154(b) by 244 days.

(21) Appl. No.: 15/072,343

(22) Filed: Mar. 16, 2016

(65) Prior Publication Data

US 2016/0270418 A1    Sep. 22, 2016

Related U.S. Application Data

(60) Provisional application No. 62/134,497, filed on Mar. 17, 2015.

(51) Int. Cl.
  *A23F 5/26*   (2006.01)
  *A47J 31/34*  (2006.01)
  (Continued)

(52) U.S. Cl.
  CPC ............ *B01D 11/0292* (2013.01); *A23F 5/26* (2013.01); *A23F 5/262* (2013.01); *A23F 5/267* (2013.01);
  (Continued)

(58) Field of Classification Search
  CPC ............ B01D 11/0292; B01D 11/0207; B01D 11/0219; B01D 11/0253; B01D 3/008;
  (Continued)

(56) References Cited

U.S. PATENT DOCUMENTS

| 191,106 A | 5/1877 | Buzby |
| 2,236,059 A | 3/1941 | Heuser |

(Continued)

FOREIGN PATENT DOCUMENTS

| CN | 200957018 | * 10/2007 |
| DE | 19727888 C1 | 11/1998 |

OTHER PUBLICATIONS

Derwent Abstract for CN200957108 published Oct. 2007.*
English Translation for CN200957108 published Oct. 2007.*

*Primary Examiner* — Anthony J Weier
(74) *Attorney, Agent, or Firm* — David Heisey; Michael Klicpera

(57) ABSTRACT

A method and apparatus for extracting compounds from raw materials with an extraction column is provided. The control and manipulation of pressure exerted and contained within the extraction vessel or column may be vital in obtaining a certain flavor profile or intensity of the effluent extracted from the raw materials. As such, the method may include directing a flow of pressurized solvent into a base of the extraction column and utilizing the flow of pressurized solvent to create a pressure gradient applied to the raw materials. The method may further include compressing the raw materials with hydraulic compression. As the raw materials become further compressed, frictional heating may result allowing most, if not all, of the volatile aromatic heat sensitive compounds and constituencies to be extracted depending on the pressure strength applied to the raw materials. As such, manipulating the pressure gradients for each extraction process allows for distinct and specific flavor profiles to be extracted from the raw materials.

10 Claims, 15 Drawing Sheets

(51) Int. Cl.
*B01D 11/02* (2006.01)
*A47J 31/44* (2006.01)
*A47J 31/24* (2006.01)
*B01D 61/48* (2006.01)
*B01D 24/10* (2006.01)
*A47J 31/36* (2006.01)
*B01D 3/00* (2006.01)
*C02F 1/469* (2006.01)
*C02F 103/02* (2006.01)

(52) U.S. Cl.
CPC ............... *A47J 31/24* (2013.01); *A47J 31/34* (2013.01); *A47J 31/36* (2013.01); *A47J 31/4407* (2013.01); *A47J 31/4478* (2013.01); *B01D 3/008* (2013.01); *B01D 11/0207* (2013.01); *B01D 11/0219* (2013.01); *B01D 11/0253* (2013.01); *B01D 24/10* (2013.01); *B01D 61/48* (2013.01); *B01D 2311/2696* (2013.01); *B01D 2313/22* (2013.01); *B01D 2313/243* (2013.01); *C02F 1/4695* (2013.01); *C02F 2103/02* (2013.01)

(58) Field of Classification Search
CPC ............... B01D 24/10; B01D 61/48; B01D 2311/2696; A23F 5/26; A23F 5/262; A23F 5/267; C02F 2103/02; C02F 1/4695; A47J 31/24; A47J 31/34; A47J 31/36; A47J 31/4407; A47J 31/4478
See application file for complete search history.

(56) References Cited

U.S. PATENT DOCUMENTS

| | | |
|---|---|---|
| 3,085,494 A | 4/1963 | Rosander |
| 3,830,940 A | 8/1974 | Sivetz |
| 4,088,794 A * | 5/1978 | Katz ........................ A23F 5/262 426/432 |
| 4,498,375 A | 2/1985 | Bedini |
| 4,728,525 A | 3/1988 | Toro et al. |
| 5,041,245 A * | 8/1991 | Benado ............... B01D 11/0226 554/10 |
| 6,004,593 A * | 12/1999 | Soughan ................ A23F 5/267 426/433 |
| 6,513,419 B2 | 2/2003 | Huber et al. |
| 9,855,516 B2 * | 1/2018 | Corey ..................... A47J 31/34 |
| 2005/0112253 A1 | 5/2005 | Kalenian |
| 2018/0085685 A1 * | 3/2018 | Corey ..................... A23F 5/262 |
| 2018/0104619 A1 * | 4/2018 | Corey ..................... A23F 5/262 |

* cited by examiner

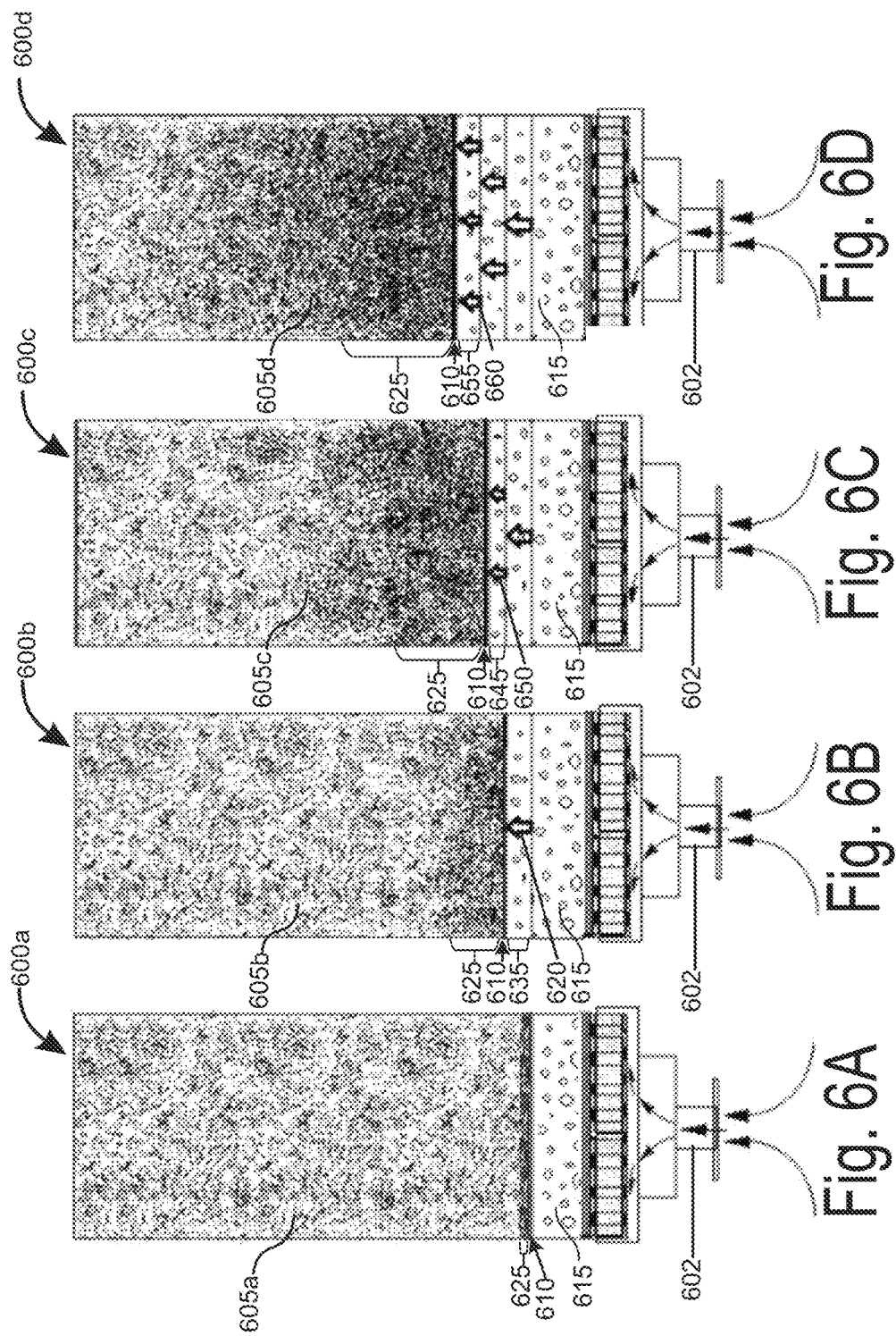

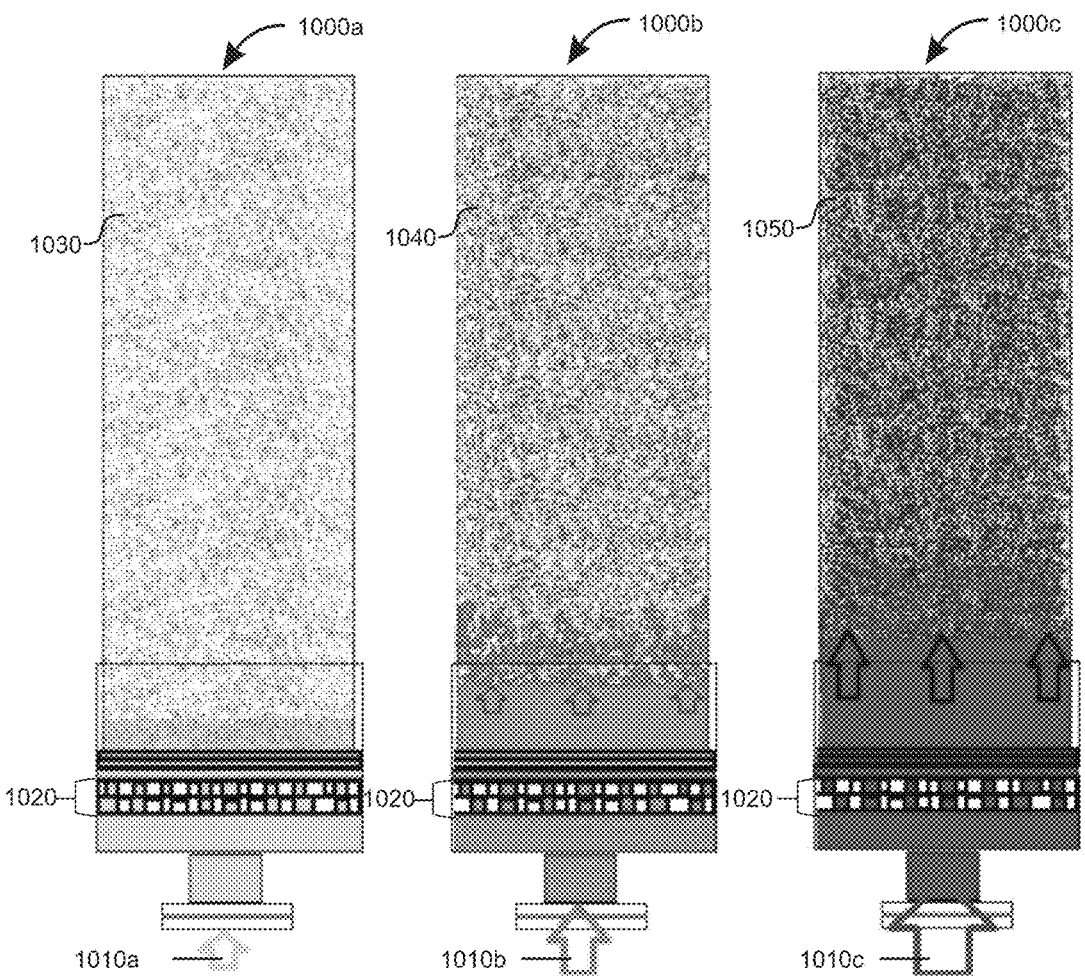

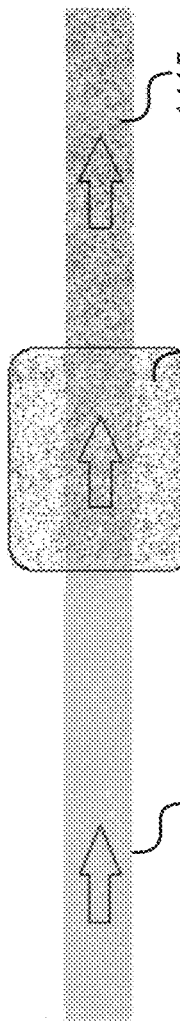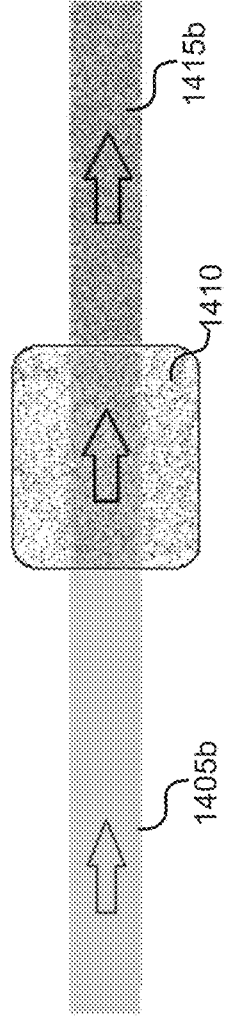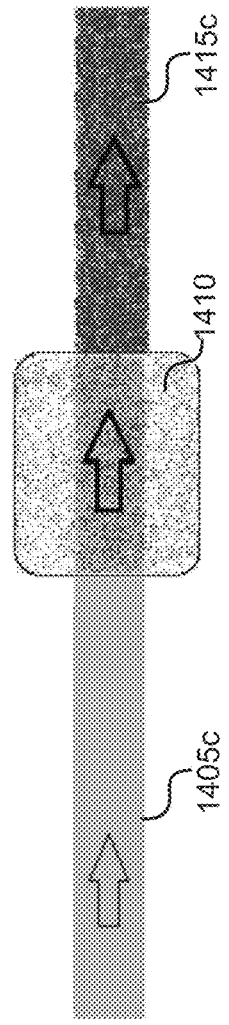

METHOD USING PRESSURE GRADIENT PROFILING IN AN EXTRACTION COLUMN

CROSS-REFERENCE TO RELATED APPLICATIONS

This application claims the benefit of and priority to U.S. Provisional Patent Application Ser. No. 62/134,497 filed on Mar. 17, 2015, which is hereby incorporated by reference in its entirety

TECHNICAL FIELD

The disclosed technology generally relates to the extraction of compounds from selected raw materials. More specifically, the present disclosure is directed towards extracting raw materials using a pressure gradient to control and manipulate flavor profiles of the effluent extracted from the raw materials.

BACKGROUND

Solid-liquid extraction is a process where compounds of a solid mixture, such as compounds in a matrix or bed of raw materials, are isolated by dissolving the desired compounds in an added solvent, where the extract is then further separated from the raw materials. As such, the process of solid-liquid extraction is often extensively utilized in a wide range of industries to extract desired bioactive and non-bioactive compounds for consumption. Examples of such compounds for consumption may be found in the following, but are not limited to, coffee beans, tea leaves, botanical herbs, spices, nutraceuticals, organic substances, and the like.

During the solid-liquid extraction process, the control and manipulation of pressure exerted and contained within the extraction vessel or column may be vital in obtaining a certain flavor profile or intensity of the effluent extracted from the raw materials. However, current technology pertaining to the solid-liquid extractions fail to provide a device or method that allows for controlling pressure within the extraction column that is driven and controlled by the accumulated energy already generated within the extraction column. It is based on these energy creators within the extraction column that may allow for generating a wide variety of pressures to be utilized to produce a desired flavor profile extracted from the raw materials.

BRIEF SUMMARY OF EMBODIMENTS

In view of the above drawbacks, there exists a long felt need for a simplified, yet effective extraction apparatus that is more cost effective, efficient, and compact in space. Furthermore, there is also a need for an extraction apparatus that includes a way of manipulating pressure and creating a pressure gradient so that a wide variety of pressures can be used to develop a specific flavor profile from the raw materials.

Embodiments of the present disclosure includes a method for extracting a compound from a material that includes directing a flow of pressurized solvent into a base of the extraction column. The process may then proceed to directing a flow of pressurized solvent into a base of the extraction column, such that flow of pressurized solvent may create a pressure gradient to be applied to the raw materials packed within the extraction column. The process may then proceed to compressing the raw materials with hydraulic compression from the pressurized solvent. Furthermore, the process may then proceed to obtaining an extracted effluent from the compressed raw materials.

Other embodiments may include an extraction column including a body that includes a pressure vessel capable of withstanding high temperatures or pressures. The extraction column may also include selected raw materials that are packed within the extraction column. Additionally, some embodiments may include a pressure gradient exerted on the raw materials as a pressurized solvent enters into the base of the extraction column and through the raw materials.

BRIEF DESCRIPTION OF THE DRAWINGS

In view of the above drawbacks, there exists a long felt need for a simplified, yet effective extraction apparatus that is more cost effective, efficient, and compact in space. Furthermore, there is also a need for raw materials to be effectively packed into an extraction column in order to obtain an efficient extraction that allows all of the volatiles, solids, and constituents within the raw materials to be properly extracted.

Embodiments of the present disclosure includes a matrix of raw materials packed within an extraction vessel that includes raw materials ground into a particle of distinct and varying sizes. In some instances, the particles may be ground to a pre-selected particle size allowing the particles to form a network as the particles nest against each other to lessen the amount the interstitial spacing within the matrix of raw materials. The matrix of raw material packed within the extraction vessel may be utilized to not only coordinate the strength, intensity, and duration of the extraction process, but the matrix of raw materials may also aid in filtering the raw material particles from the extracted effluent as the effluent flows through the matrix of raw materials and proceeds to exit the extraction column.

Other embodiments may include a method for extracting a compound from the raw materials packed into an extraction column. Such embodiments may include grinding the raw materials such that the particles from the ground raw materials comprise of pre-selected particle sizes. In some instances, the pre-selected particle sizes of the raw materials form a network as the particles nest against each other to the lessen the amount of interstitial spacing within a matrix of raw materials within an extraction vessel. Additionally, the method may also include packing the ground raw materials into the extraction vessel. Furthermore, some embodiments may also include distributing a flow of pressurized solvent at the base of the extraction vessel to extract the ground raw materials. Such a method not only aids in controlling the strength, intensity, and duration of the extraction process, but may also even aid in filtering the raw material particles from the extracted effluent as the effluent flows through the matrix of raw materials and proceeds to exit the extraction column.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration, these drawings are not necessarily made to scale.

Figure 1:
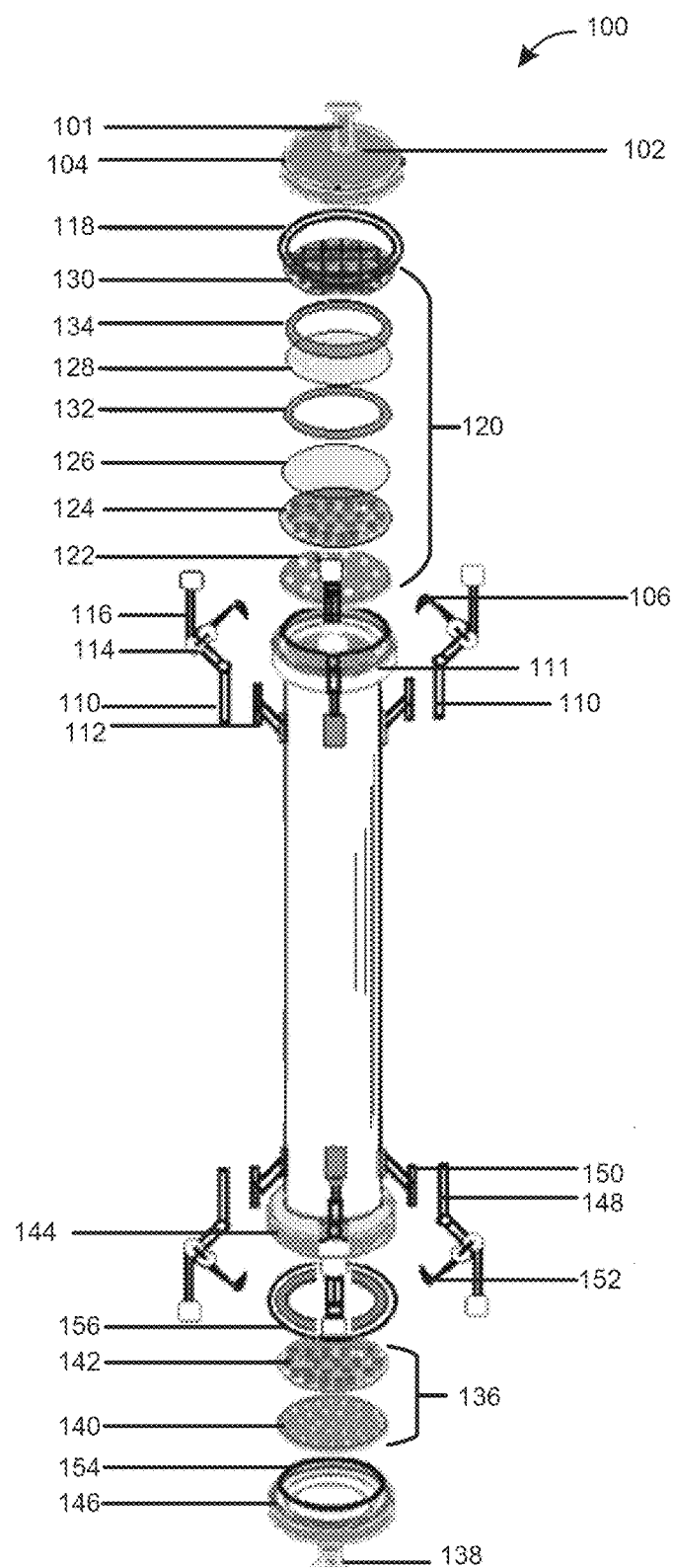

FIG. 1 illustrates an exploded view of a single extraction column, consistent with embodiments disclosed herein.

Figures 2A, 2B:
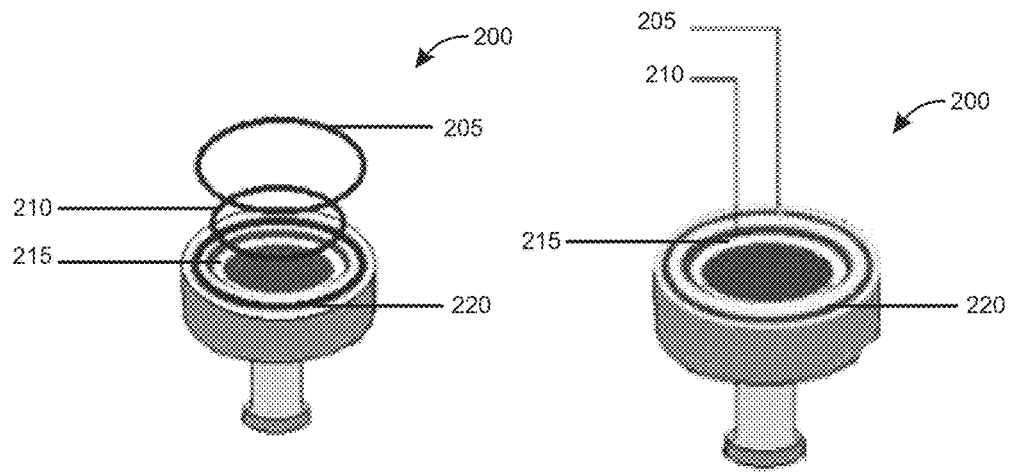

FIG. 2A illustrates an exploded view of a removable pressure cap of the extraction column, consistent with embodiments disclosed herein.

FIG. 2B illustrates a removable pressure cap of the extraction column, consistent with embodiments disclosed herein.

Figure 3:
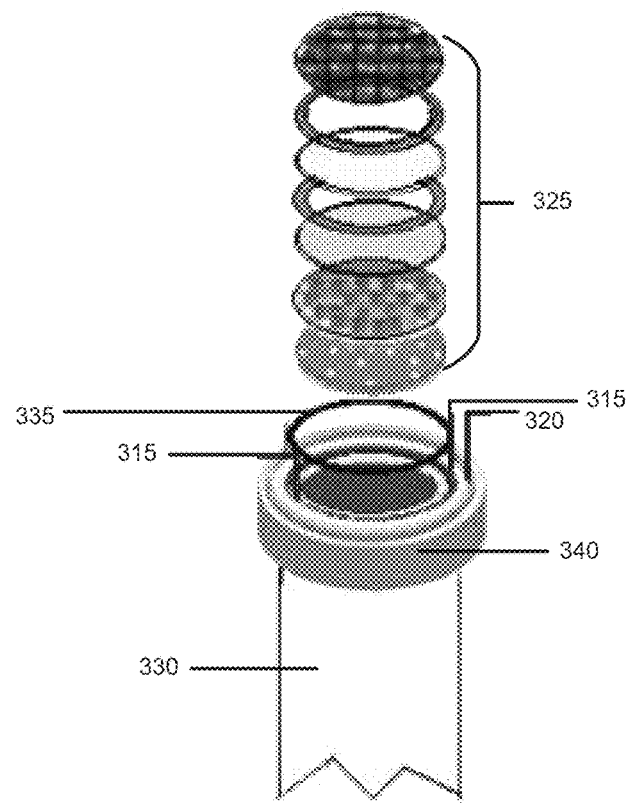

FIG. 3 illustrates an exploded view of a filtration core assembly to be placed within the outlet vessel flange of the extraction column, consistent with embodiments disclosed herein.

Figure 4A:
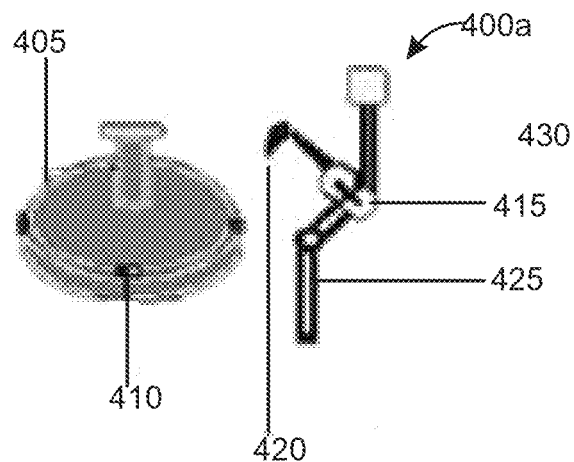

FIG. 4A illustrates a perspective view of a locking mechanism configured to securely seal a removable end cap onto the extraction column, consistent with embodiments disclosed herein.

Figure 4B:
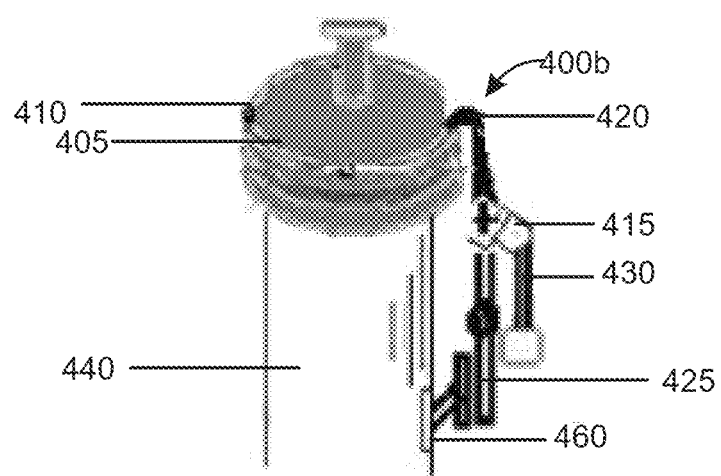

FIG. 4B illustrates a perspective view of a locking mechanism in a locked position to securely seal the removable pressure cap onto the extraction column, consistent with embodiments disclosed herein.

Figure 5A:
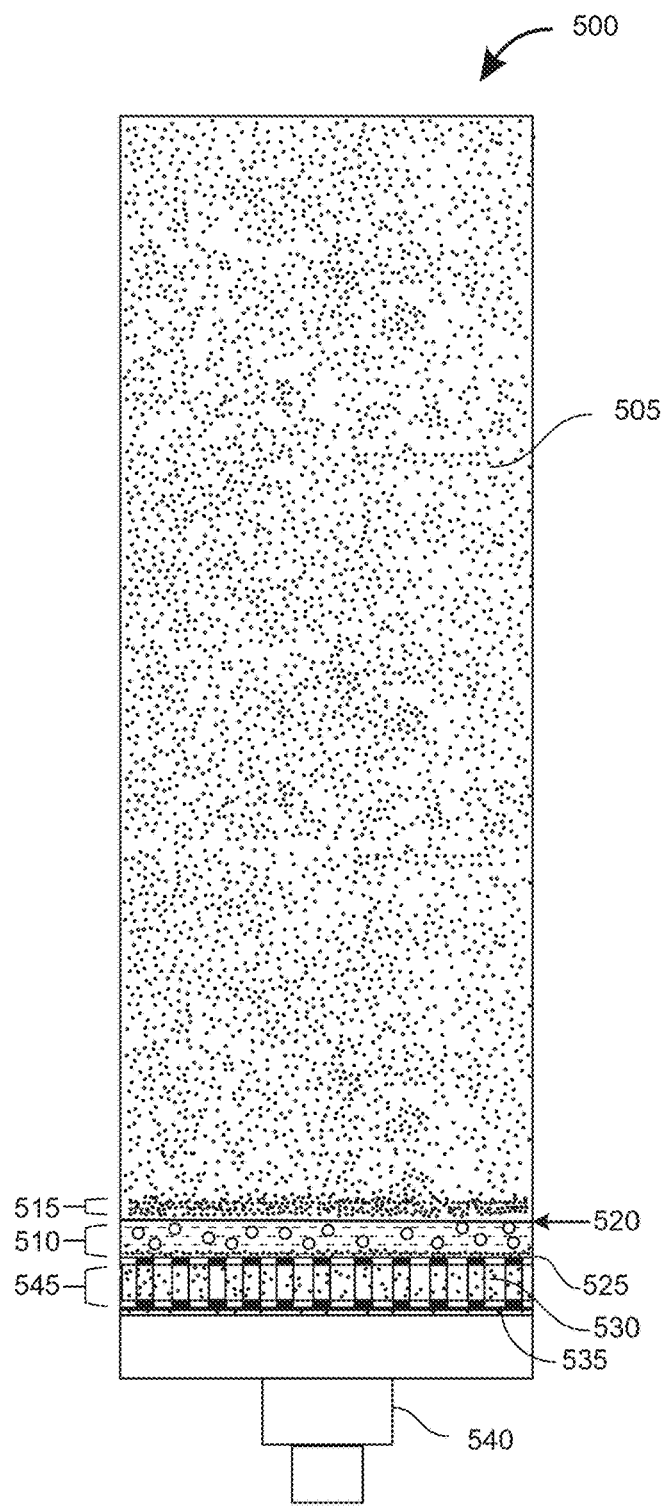

FIG. 5A illustrates a cross-sectional side view of an extraction column at the beginning stage of the extraction process, consistent with embodiments disclosed herein.

Figure 5B:
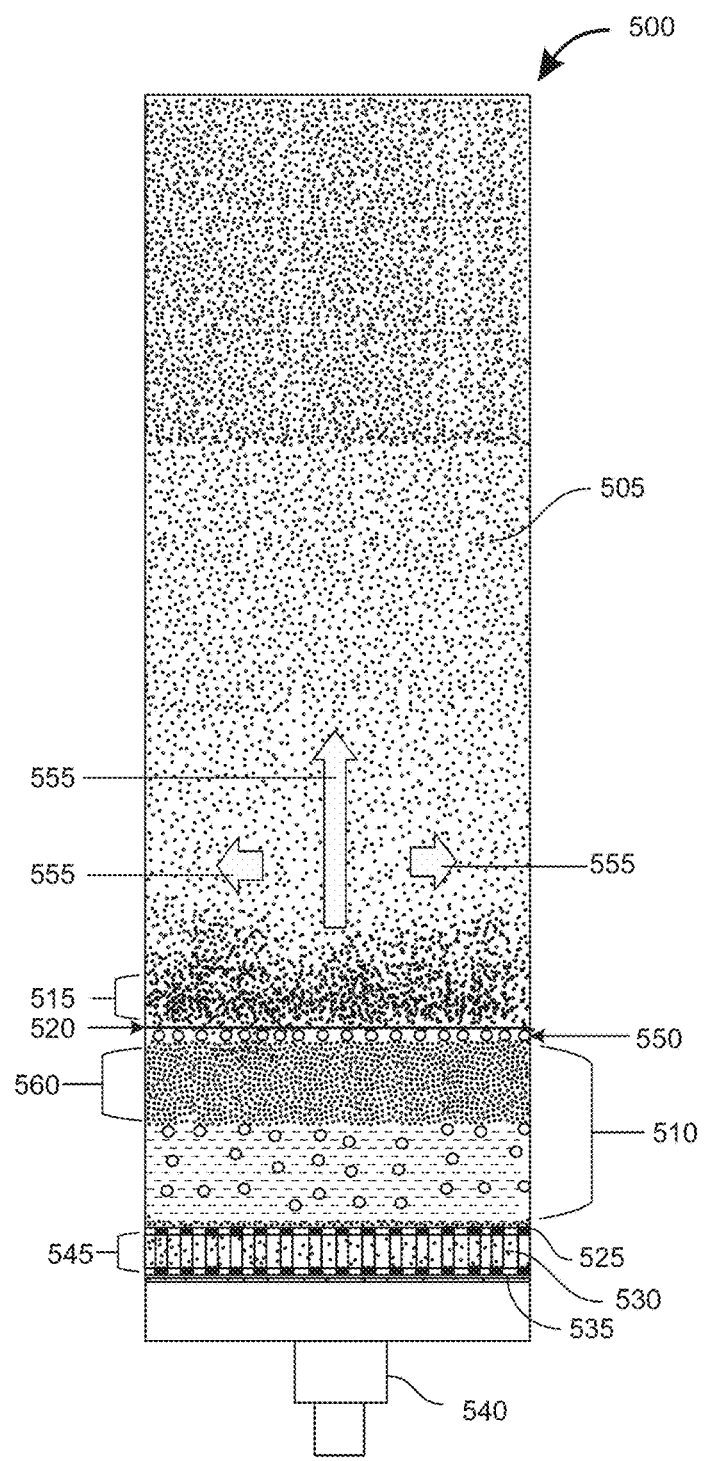

FIG. 5B illustrates a cross-sectional side view of an extraction column at a more mature stage along the extraction process, consistent with embodiments disclosed herein.

Figure 5C:
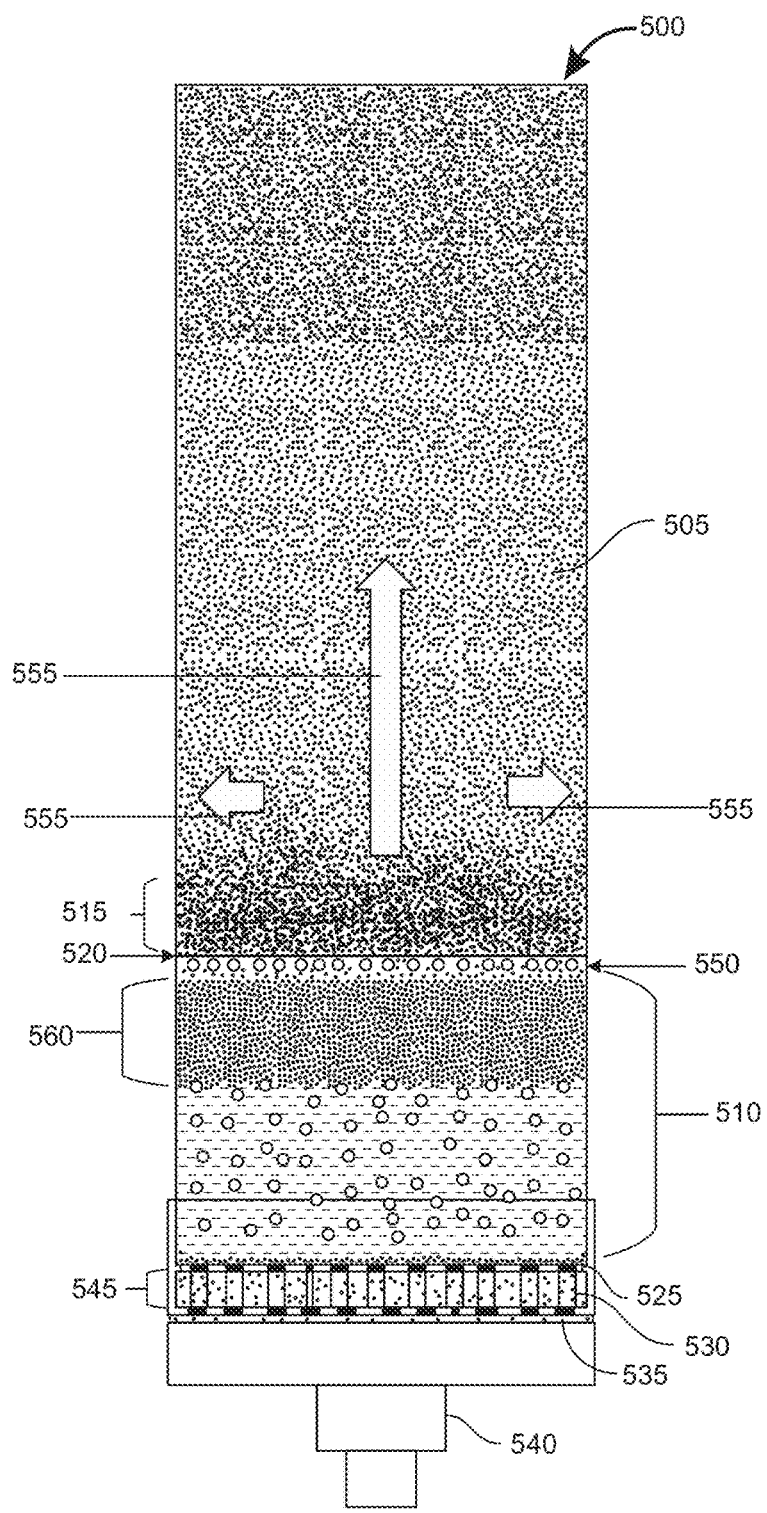

FIG. 5C illustrates a cross-sectional side view of an extraction column towards the completion of the extraction process, consistent with embodiments disclosed herein.

FIG. 6A illustrates a cross-sectional side view of the rising flow of solvent impacting into the bed of raw materials as the extraction process progresses, consistent with embodiments disclosed herein.

FIG. 6B illustrates a cross-sectional side view of the rising flow of solvent impacting into the bed of raw materials as the extraction process progresses, consistent with embodiments disclosed herein.

FIG. 6C illustrates a cross-sectional side view of the rising flow of solvent impacting into the bed of raw materials as the extraction process progresses, consistent with embodiments disclosed herein.

FIG. 6D illustrates a cross-sectional side view of the rising flow of solvent impacting into the bed of raw materials as the extraction process progresses, consistent with embodiments disclosed herein.

Figure 7:
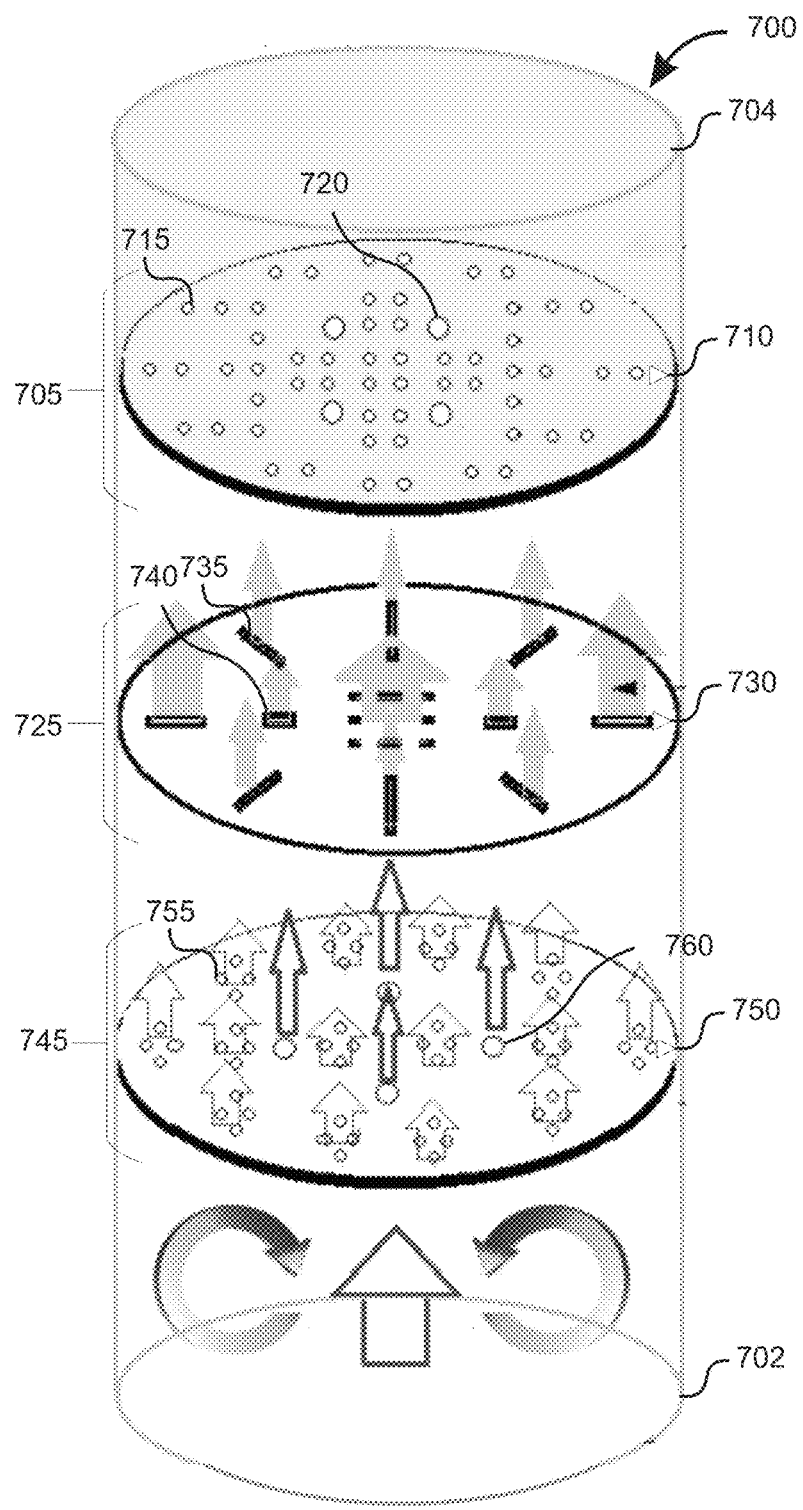

FIG. 7 illustrates an exploded view of a flow governor assembly in an extraction column, consistent with embodiments disclosed herein.

Figure 8:
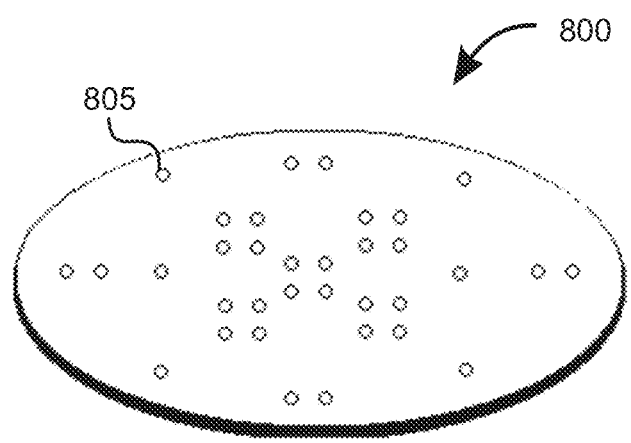

FIG. 8 illustrates a perspective view of a limiter disc, consistent with embodiments disclosed herein.

Figure 9A:
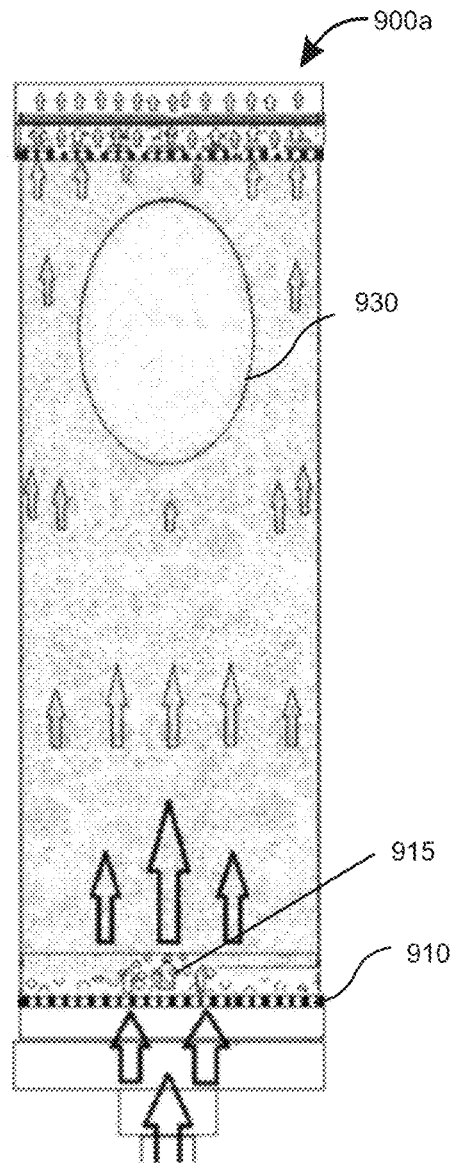

FIG. 9A illustrates a cross-sectional side view of an extraction column without a flow governor assembly and a limiter disc, consistent with embodiments disclosed herein.

Figure 9B:
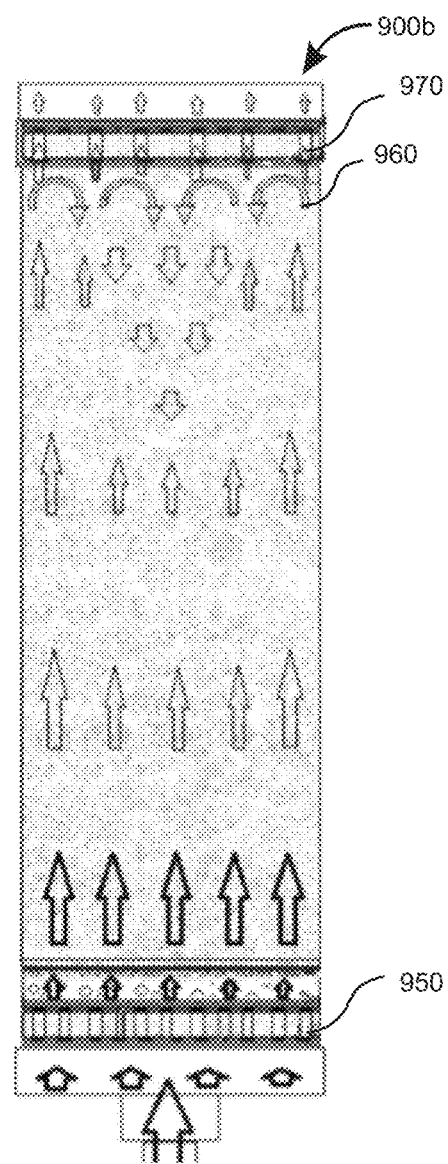

FIG. 9B illustrates a cross-sectional side view of an extraction column with a flow governor assembly and a limiter disc, consistent with embodiments disclosed herein.

FIG. 10A illustrates a particular pressure gradient in an extraction column that results in a particular flavor profile from the effluent extracted from the raw materials, consistent with embodiments disclosed herein.

FIG. 10B illustrates a particular pressure gradient in an extraction column that results in a particular flavor profile from the effluent extracted from the raw materials, consistent with embodiments disclosed herein.

FIG. 10C illustrates a particular pressure gradient in an extraction column that results in a particular flavor profile from the effluent extracted from the raw materials, consistent with embodiments disclosed herein.

Figure 11A:
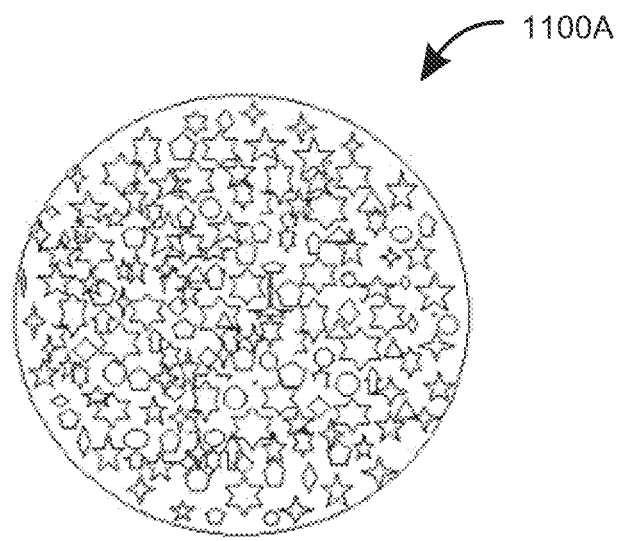

FIG. 11A illustrates a grind sample of raw materials under magnification, consistent with embodiments disclosed herein.

Figure 11B:
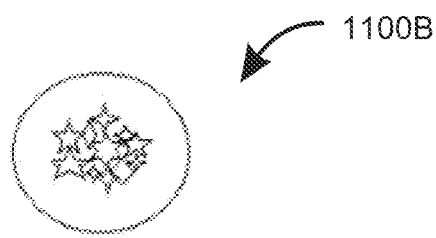

FIG. 11B illustrates a grind sample of raw materials under magnification during hydraulic compression, consistent with embodiments disclosed herein.

Figure 12A:
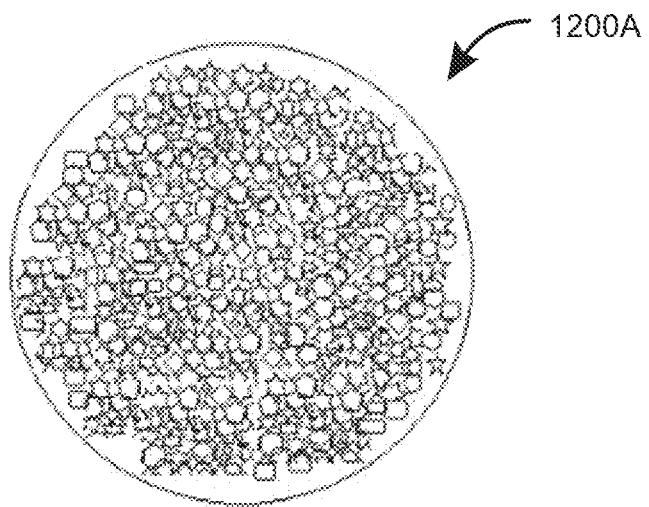

FIG. 12A illustrates a grind sample of raw materials under magnification, consistent with embodiments disclosed herein.

Figure 12B:
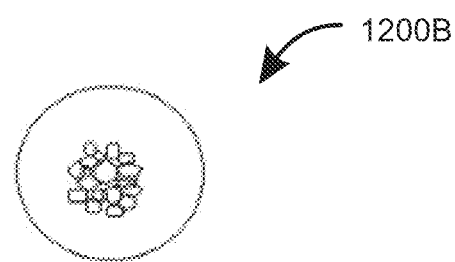

FIG. 12B illustrates a grind sample of raw materials under magnification during hydraulic compression, consistent with embodiments disclosed herein.

Figure 13:
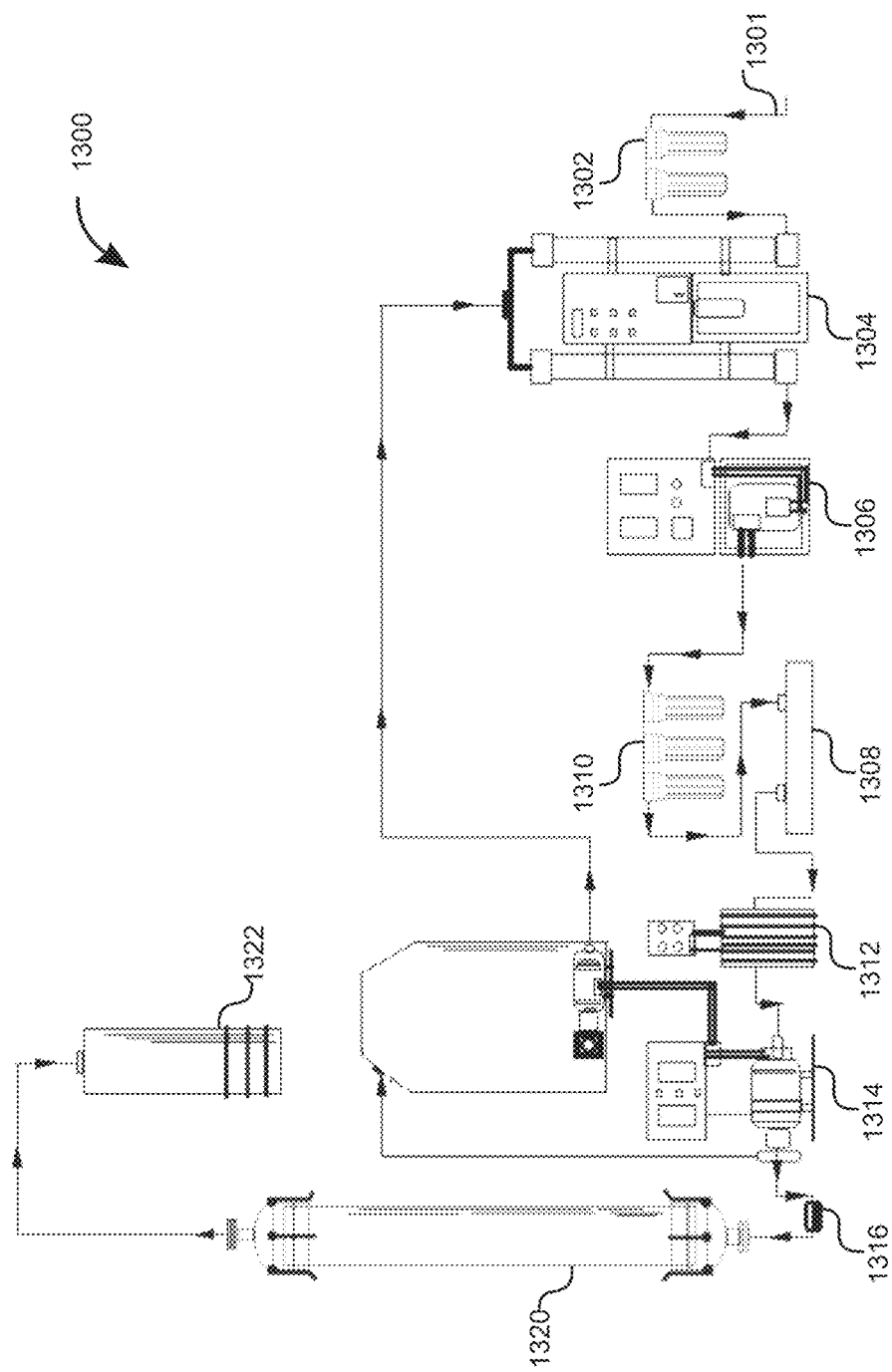

FIG. 13 illustrates a water treatment system to restructure solvent for an extraction process, consistent with embodiments disclosed herein.

FIG. 14A illustrates a carrying capacity of a solvent used to extract the raw materials with the extraction process, consistent with embodiments disclosed herein.

FIG. 14B illustrates a carrying capacity of a solvent used to extract the raw materials with the extraction process, consistent with embodiments disclosed herein.

FIG. 14C illustrates a carrying capacity of a solvent used to extract the raw materials with the extraction process, consistent with embodiments disclosed herein.

The figures are not intended to be exhaustive or to limit the disclosed technology to the precise form disclosed. It should be understood that the disclosed technology can be practiced with modification and alteration, and that the disclosed technology be limited only by the claims and the equivalents thereof.

DETAILED DESCRIPTION OF THE EMBODIMENTS

The following description is non-limiting and is made merely for the purpose of describing the general principles of the disclosed embodiments. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Some embodiments of the disclosure provide an extraction column configured to extract compounds from raw materials, such as coffee beans, tea leaves, botanical herbs, spices, nutraceuticals, organic substances, and the like. The disclosed extraction column is configured to contain and catalyze critical energy creators within the extraction column in order to generate sufficient mechanical and thermal energy to extract the necessary compounds from the desired raw materials. Both the mechanical and thermal energy elicited from catalyzed energy creators are manipulated and reapplied within the extraction to create a self-perpetuating and self-sustaining extraction process. The release and re-use of the generated mechanical and thermal energy not only yields the maximization of extraction efficiency, but also allows for a very high energy and dynamic extraction to take place so that a more concentrated extract is obtained at a fraction of the extraction time when compared to current industry standards.

Additionally, the embodiments of the extraction column may be further configured to provide a trailing cool layer of solvent so that the extracted heat sensitive and fragile compounds are not degraded or damaged by the release of thermal energy within the extraction column. The trailing cool layer of solvent thus fully and effectively preserves the complex and aromatic flavor compounds contained within the extracted effluent.

FIG. 1 illustrates an exploded view of a single extraction column 100, consistent with embodiments disclosed herein. In some embodiments, the extraction column 100 may be configured in various shapes and sizes in order to accommodate the various extraction types and configuration of the extraction column 100. By way of example, the extraction column 100 may include an aspect ratio with a range of 5:1-9:1. In the instance that the extraction column is circular, the radius of the extraction column 100 may further include a range of 1.5-8 inches. By way of example only, where the extraction column 100 is configured to be placed on a bench top, the radius of the extraction column 100 may include a range of 1.5-4 inches, while as an extraction column 100 configured for purposes of commercial use may include a radius with a range of 4-8 inches.

As further illustrated, a removable outlet pressure cap 102 is configured to cover the opening near the outlet vessel flange 111 to adequately seal the opening of the extraction column 100. In some embodiments, the removable outlet pressure cap 102 includes a clamp head receptacle 104 that is configured to securely receive a corresponding clamp lock head 106 of the locking mechanism 110. More specifically, the locking mechanism 110 may be mounted onto the sides of the extraction column 100 by being attached onto corresponding clamp lock mount receptacles 112 affixed to the sides of the extraction column 100.

Additionally, the clamp lock head 106 may be further configured to effectively ensure that the outlet pressure cap 102 seals the extraction column 100, even when the extraction column 100 contains high amounts of heat and pressure during the extraction process. By way of example only, the extraction column 100 may be configured to withstand pressure up to 350 pounds per square inch (hereinafter "PSI"), and as such, the clamp head lock 106 may also be configured to withstands up to 350 PSI.

In some embodiments, the locking mechanism 110 includes a clamp body with octagonal opposing cogs 114, thus allowing the clamp lock head 106 to pivot in an upward and downward motion, further allowing the clamp lock head 106 to be placed in and out of the corresponding clamp head receptacle 104. Additionally, the locking mechanism 110 may further include clamp lever 116 attached to the octagonal opposing cogs 114. In some embodiments, the clamp levers 116 are configured to aid in pivoting the clamp lock head 106 in the desired upward and downward motion. By way of example only, the clamp lock head 106 may be placed in an open position by pushing the clamp levers 116 away from the extraction column 100, thus allowing the clamp lock head 106 to move freely and to disengage from the clamp head receptacle 104. In another example, the clamp lock head 106 may be placed in a locked position to effectively seal the extraction column 100 by pushing the clamp levers 116 towards the mid-section of the extraction column 100. By doing so, the clamp lock head 106 is securely engaged within the clamp head receptacle 104. However, it should be noted that a wide variety of high-strength locking clamps or lock seals may be used to seal the removable outlet pressure cap 102 to the opening end of the extraction column 100.

As further illustrated in FIG. 1, an O-ring 118 may be placed in between the removable outlet pressure cap 102 and a filtration core assembly 120 configured to be placed within the opening of the outlet vessel flange 111 of the extraction column 100. In some embodiments, the removable outlet pressure cap 102 is configured to include an inner indent (not shown here) that allows the O-ring 118 to be securely seated within the removable outlet pressure cap 102. Accordingly, the O-ring 118 may ensure proper pressure sealing when the removable outlet pressure cap 102 covers the opening end of the extraction column 100 as the extraction process is underway. In some embodiments, the O-ring 118 may include materials made of PTFE, Buna, Neoprene, EPDM rubber, silicon, or fluorocarbon. The selected material for the O-ring 118 may take into consideration the chemical compatibility, application temperature, sealing pressure, durometer, and perimeter size of the area to be sealed.

Additionally, the filtration core assembly 120 may be configured to filter any extraneous raw material sediment or particles trapped within the fully extracted effluent, further ensuring that the extracted effluent is free from fine particles or sediment bleeding contamination. By way of example only, the filtration core assembly 120 may include a limiter disc 122 that makes contact with the completely extracted effluent that is ready to be filtered and separated from the extracted raw materials packed within the extraction column 100. The limiter disc 122 is the first barrier of the filtration core assembly 120. Furthermore, the limiter disc 122 may further act as an outlet retainer holding the packed raw materials in place so that that raw materials do not freely travel through the filtration core assembly 120. Additionally, the limiter disc 122 may limit the flow of effluent leaving the extraction column 100 relative to the incoming flow of solvent entering the extraction column 100. In such a case, the limiter disc 122 may be configured to allow half the amount of effluent to leave the extraction column relative to the amount of solvent entering the extraction column 100. This then creates a flow differential and a pressure differential within the extraction column 100. However, it should be noted that a wide range of operating ratios of the flow of effluent leaving the extraction column relative to the flow of incoming solvent entering the extraction column 100 may be present, such as 3:1, 4:1, 5:1, and 6:1 ratio by way of example only.

The limiter disc 122 may include a semi-permeable disk configured to include material made of reinforced steel, or other materials as would be appreciated by one of ordinary skill in the art upon studying the present disclosure. Additionally, the limiter disc 122 may include a specification of ¼" 316 L, or a size that neatly fits within the perimeter of the extraction column 100.

Next, the filtration core assembly 120 may also include a first filter disc 124 that works as a primary filter that seeks to prevent any raw materials or particles from coming further within the filtration core assembly 120. Additionally, in some embodiments, the first filter disc 124 may be configured to include material made of reinforced steel, such as 316 L stainless steel mesh, or any other material appreciated by one of ordinary skill in the art upon studying the present disclosure. Additionally, the first filter disc 124 may further include a cross-weave anti-extrusion 25 micron mesh capable of capturing particles as small as 25 micrometers.

Next, the filtration core assembly 120 may include a second filter disc 126 that is placed behind the first filter disc 124. The second filter disc 126 may be configured to further prevent any fine particles or sediment from coming further within the filtration core assembly 120, thus further ensuring that the fully extracted effluent is free from any particle contamination as the extracted effluent passes through the filtration core assembly 120. The second filter disc 126 may be configured to include a hydrophilic membrane disc with a 10 micron mesh capable of capturing particles as small as 10 micrometers.

In further embodiments, the filtration core assembly 120 includes a third filter disc 128 that follows behind the second filter disc 126. The third filter disc 128 is placed within the filtration core assembly 120 to aid in further preventing fine particles or sediment from coming further within the filtration core assembly 120. The third filter disc 128 may be configured to include a poly-weave nylon fiber, or other material appreciated by one of ordinary skill in the art upon studying the present disclosure. Additionally, the third filter disc 128 may include a 5 micron mesh configured to capture particles as small as 5 micrometers. However, it should be noted that the coarseness or the fineness of the filter micron sizes are interchangeable depending on solvent quality flowing through the filtration core assembly 120 and the type of raw materials to be extracted.

Additionally, a first separator seal 132 may be placed in between the second filter disc 126 and the third filter disc 128 to help increase the flow of extracted effluent through the filtration core assembly 120 and prevent the load up of any fine particles or sediments from the raw materials captured by the filter discs. By way of example only, the first separator seal 132 may include materials made of PTFE, Buna, Neoprene, EPDM rubber, silicon, and fluorocarbon. The selected material may take into consideration the chemical compatibility, application temperature, sealing pressure, durometer, and perimeter size of the area to be sealed.

However, it should be noted that while there are multiple filters within the filtration core assembly 120 to filter the fine particles or sediments from the extracted effluent, the bulk and majority of the filtration may be performed by the raw materials themselves. By way of example only, the main purpose of the filtration core assembly 120 is simply configured to capture any solid material not filtered by the raw materials. As such, in some instances, due to the quasi-interlocking network of the poly-grain, the filtering capability of the raw materials themselves may be able to capture 99.9%-99.999% of all the particles and sediments therein. As such, the filtration core system 120 is then configured to filter the remaining 0.1%-0.001% percent of any remaining particles or sediments still remaining in the extracted effluent. This particular phenomenon of the raw materials being able to act as its own best filtering agent during the extraction process is due to the particular way the raw materials or coffee grounds are packed into the extraction column, otherwise known as a poly-grain grind matrix. The poly-grain grind matrix is a matrix of varying sizes of the raw materials specifically chosen to form a matrix that is designed to nest together to form a specific quasi-interlocking pattern, thus allowing the poly-grain grind matrix to capture or trap the raw material particles or fine granules such that the filtration core system 120 only catches the small amount of particles that get past the poly-grain grind matrix.

This phenomenon of the poly-grain grind matrix being able to act as its own best filtering agent is due to the way the raw materials are nested together to form a specific pattern, otherwise known as a "quasi-fit." Such a quasi-interlocking pattern allows the grounds to sit against one another in such a way that allows a good degree of interstitial spaces of the raw materials to be removed when the raw materials are packed and compressed. However, not all of the interstitial spacing is removed in order to allow the raw materials to swell and solvent to pass through, which will be explained in greater detail below.

Referring back to FIG. 1, the filtration core assembly 120 may include a quad mesh disc 130 placed immediately behind the third filter disc 128, or the filtration core assembly 120. In accordance with some embodiments, the quad mesh disc 130 may be further configured to help ensure that the raw material is prevented from exiting the extraction column 100. Additionally, the quad mesh disc 130 may also help ensure that the bendable and malleable filter discs 128, 126, 124 beneath the quad mesh disc 130 are prevented from extruding and remain properly aligned. The quad mesh disc 130 may be made of 316 L stainless steel. However, it should be noted that the quad mesh may consist of another size or material as appreciated by one of ordinary skill in the art upon studying the present disclosure.

Furthermore, a second separator seal 134 may also be placed in between the third filter 128 and the quad mesh disc 130 to further help increase the flow of extracted effluent and prevent any load up of any remaining fine particles or sediments that have managed to pass through the filters 124, 126, 128 of the filtration core assembly 120. By way of example only, the first separator seal 132 may include materials made of PTFE, Buna, Neoprene, EPDM rubber, silicon, and fluorocarbon. The selected material may take into consideration the chemical compatibility, application temperature, sealing pressure, durometer, and perimeter size of the area to be sealed.

In accordance to some of the embodiments, the extraction column 100 includes a flow governor assembly 136 configured to receive an inflow of solvent selected to extract the raw materials of interest. The flow governor assembly 136 may further be configured to control the rate of solvent flow as the solvent enters the base of the extraction column 100 via the connector feed 138. The connector feed 138 may attach to a solvent source (not shown here) and help guide a flow of solvent into the extraction column 100. By way of example only, the solvent source may include a water treatment system configured to restructure water or water quality. In other instances, solvent source may also include a city water line or even a solvent tank.

Additionally, the flow governor assembly 136 may prevent the formation of any concentrated surge of solvent from entering the base of the extraction column 100. In the instance that the formation of such concentrated surge of solvent or turbulence is not prevented, the incoming flow of solvent will likely cause drilling or the formation of holes within the bed of raw materials, otherwise known as center holing. The occurrence of such center holing may cause an uneven and poor extraction of the raw materials as the uncontrolled surges of solvent seek to travel along the point of least resistance (also known as channeling) such as up the sides of the extraction column 100. Accordingly, the flow governor assembly 136 may include at least a first disc 140 and a second disc 142 to allow the incoming flow of pressurized solvent to spread out evenly before making contact with the bed of raw materials packed at the base of the extraction column 100. The evenly formed well of fluid then becomes surge-less and non-turbulent with a flat, linear solvent surface layer, otherwise known as a solvent flat-well. The solvent flat-well is a smooth, even, and non-turbulent well of rising solvent with a perfectly flat and linear surface layer, which has the capacity to contact and connect with the base of the coffee grounds simultaneously across all of its surface area and continue to rise through the coffee grounds in the same manner. Only in such a way can there be an even distribution of the maximum amount of hydraulic force throughout the entire extraction process. Accordingly, the flow governor assembly 136 provides a predictable flow control of solvent with each extraction.

Additionally, the first disc 140 and the second disc 142 of the flow governor assembly 136 may be configured to include perforations and slits on the disc, such that depending on the number and size of perforations and slits present, the rate of the flow of the solvent entering the base of the extraction column 100 may be controlled. By way of example only, the flow governor assembly 136 may be configured such that the incoming flow of solvent entering the extraction column 100 via the flow governor assembly 136 is twice the rate as the flow of extracted effluent leaving the extraction column 100. In some embodiments, the flow ratio is configured 2:1, such that the incoming flow of solvent is twice the rate as the flow extracted effluent leaving the extraction column 100. However, the ratio may be configured so as to accommodate various ranges, such as 3:1, 4:1, 5:1, or even 6:1 depending on the type of raw material to be extracted, the selected solvent, and the pressure setting or the amount of energy to be contained within the extraction column 100.

Furthermore, in order to further securely place the flow governor assembly 136 within the inlet vessel flange 144 of the extraction column 100, a removable inlet pressure cap 146 may be utilized to effectively seal and cover the opening near the inlet vessel flange 144. In one embodiment, the removable inlet pressure cap 146 makes contact with the inlet vessel flange 144, allowing the flow governor assembly 136 to be securely seated within the extraction column 100. In further embodiments, a locking mechanism 148 is attached to the corresponding clamp lock mount receptacles 150 affixed to the sides of the extraction column 100. Accordingly, the removable inlet pressure cap 146 may include a clamp head receptacle (not shown here, but identical to the one shown on the removable outlet pressure cap 102) configured to receive the clamp head lock 152. As discussed above with respect to the locking mechanism 110, the exact lock configuration may be used to securely seal the removable inlet pressure cap 146 to the extraction column 100. By way of example, a range from two to six locking mechanisms 148 may be attached to the sides of the extraction column 100 near the inlet vessel flange 144. However, it should be noted that a wide variety of high-strength locking clamps or lock seals may be used to securely attach the removable inlet pressure cap 146 to the opening end of the extraction column 100.

Additionally, a first solvent diffuse O-ring 154 may be included to be seated in between the removable inlet pressure cap 146 and the flow governor assembly 136. Additionally, a second solvent diffuse O-ring 156 may be seated in between the inner indent of the inlet vessel flange 144 and the second disc 142 of the flow governor assembly 136. The solvent diffuse O-rings 154, 156 may aid in ensuring a properly sealed environment. The solvent diffuse O-rings 154, 156 may include several different materials, such as PTFE, Buna, Neoprene, EPDM rubber, silicon, and fluorocarbon. The selected material for the solvent diffuse O-ring may take into consideration the chemical compatibility, application temperature, sealing pressure, durometer, and perimeter size of the area to be sealed.

FIG. 2A illustrates an exploded view of a removable pressure cap 200 of the extraction column, consistent with embodiments disclosed herein. FIG. 2A will generally be described in conjunction with FIG. 2B, which further illustrates an assembled removable pressure cap 200. As illustrated, the removable pressure cap 200 includes both an outer ridge slot 220 and an inner ridge slot and detent 215 that seats the corresponding O-rings 205,210 securely within the removable pressure cap 200. As such, the placement of the O-rings 205,210 into the corresponding outer ridge slot 220 and the corresponding inner ridge slot and detent 215 further ensures that the removable pressure cap 200 is properly sealed onto either the opening at the inlet vessel flange (not shown here) or the opening at the outlet vessel flange (not shown here). Additionally, the inner ridge slot and detent 215 may provide a floor to receive a filtration core assembly (not shown here) at the inlet vessel flange (not shown here) of the extraction column or a quad mesh disc (not shown here) at the outlet vessel flange (not shown here) of the extraction column.

FIG. 3 illustrates an exploded view of a filtration core assembly 325 to be placed within the outlet vessel flange 340 of the extraction column 330, consistent with embodiments disclosed herein. The outlet vessel flange 340 may further include an outer ridge 320 and an inner ridge 315. The inner ridge 315 may seat a corresponding O ring 335 securely within the outlet vessel flange 340. Additionally, the inner ridge 315 may further support the filtration core assembly 325 so that all the 7 pieces of the exemplary filtration core assembly is securely seated within the inner ridge 315. In some embodiments, the filtration core assembly 325 may be seated on the corresponding O ring 335, thus preventing the filtration core assembly from being worn down when in direct contact with the inner ridge 315. In other instances, the O-ring 335 may further allow an effective seal to form between the extraction column 330 and the removable end cap (not shown here). Furthermore, the inner ridge 315 and the outer ridge 320 may fit into the corresponding slots on a removable pressure cap (not shown here), thus further allowing a secure seal between the removable pressure cap and the outlet vessel flange 340. Accordingly, the inlet vessel flange (not shown here), may also have similar outer and inner slots so that the corresponding removable pressure cap (not shown here) may also be securely sealed with the corresponding inlet vessel flange (not shown here).

FIG. 4A illustrates a perspective view of a lock assembly 400a configured to securely attach to a removable pressure cap 405 of the extraction column (not shown here), consistent with embodiments disclosed herein. FIG. 4A will generally be described in conjunction with FIG. 4B, which further illustrates the lock assembly 400b in a locked position so that the removable pressure cap 405 is securely sealed onto the extraction column 440. It should be noted that FIGS. 4A and 4B is a generalized depiction of the lock assembly 400 that can be configured to clamp onto both the removable outlet pressure cap and the removable inlet pressure cap at the opposing respective ends of the extraction column 440, such as the near the inlet vessel flange and the outlet vessel flange, as depicted in FIG. 1.

As further illustrated, FIGS. 4A and 4B depict a top view of the removable end cap 405 with clamp head receptacles 410 configured to receive a corresponding clamp lock head 420. In some embodiments, the clamp lock head 420 may have a clamp body configured with octagonal opposing cogs 415, thus allowing the clamp lock head 420 to pivot in an upward and downward motion. The pivoting motion of the clamp lock head 420 may allow the clamp lock head 420 to be placed in and out of the corresponding clamp head receptacles 410.

Additionally, the locking mechanisms 400a,b in FIGS. 4A and 4B may further include a clamp lever 430 attached to the octagonal opposing cogs 415, so as to control the pivoting motion of the clamp head lock 420. By way of example only, pushing the clamp lever 430 towards the mid-section of the extraction column 440 may allow the clamp lock head 420 to be in a closed position, thus allowing the removable pressure cap 405 to be tightly clamped within the corresponding clamp head receptacle 410, thus further securely attaching and sealing the removable pressure cap 405 to the pressure column 440. By way of another example, pulling the clamp lever 430 away from the extraction column 440 may allow the clamp lock head 420 to be in an open position, thus freely allowing the clamp head lock 420 to disengage and be removed from the corresponding clamp head receptacle 410.

FIG. 5A illustrates a cross-section side view of an extraction column 500 at the beginning stage of the extraction process, consistent with embodiments disclosed herein. FIG. 5A will generally be described in conjunction with FIGS. 5B and 5C in order to further illustrate the various progressive occurrences taking place inside the extraction column 500 as the extraction process proceeds to completion. As illustrated, FIG. 5A depicts the raw materials 505 packed into the extraction column to be extracted via solid-liquid extraction. In this particular instance, by way of example only, the raw materials to be extracted include coffee grounds 505. However, it should be noted that the raw materials are not limited to coffee grounds 505, and instead, may contain a wide variety of other raw materials, such as tea leaves, botanical herbs, spices, cocoa, fruits, nutraceuticals, organic substances, and the like.

In some embodiments, the coffee grounds 505 may first be hand packed within the extraction column 500, which may consist of initially filling no more than 25-30% of the extraction column 500. The remaining open space of the extraction column 500 may then be further packed with the remaining coffee grounds 505 using a tamper. Because certain liquid fluids, such as water, characteristically goes from a region of high pressure to a region of low pressure, it is important that the column of packed coffee grounds 505 is evenly packed in order to ensure that the solvent evenly rises and evenly permeates throughout the packed coffee grounds 505.

Once the coffee grounds 505 are properly packed, the inlet connector feed 540 located at the base of the extraction column 500 channels the inflow of solvent, which may be pressurized, towards the base of the extraction column 500. In accordance with some of the embodiments, as the solvent enters into the base of the extraction column 500, the solvent first comes in contact with the flow governor assembly 545. The flow governor assembly 545 is configured to take the incoming high pressure solvent flow from the connector feed 540 and prevent the formation of any turbulence or solvent surging, especially since solvent naturally seeks a route of least resistance within the packed coffee grounds 505. By preventing the formation of any turbulence or surge points, an incomplete and poor extraction is avoided.

More specifically, as the incoming flow of solvent enters the base of the extraction column 500, the solvent may first come in contact with the first contact surface 535 of the flow governor assembly 545. The first contact surface 535 helps break up and distribute the incoming flow of solvent and contain any surging or turbulence to the upstream portion of the flow governor assembly. Once the incoming flow of solvent passes through the first contact surface 535, the solvent may then proceed to enter the regulator disc 530 of the flow governor assembly 545, which includes precisely spaced and carefully measured slits to allow the incoming flow of solvent to pass through. As the flow of solvent passes through the regulator disc 530, the solvent is divided and redistributed so that the solvent is evenly dispersed and regulated. In some embodiments, the regulator disc 530 is a perforated 316 L stainless steel disc. Additionally, other materials may be used as would be appreciated by one of ordinary skill in the art upon studying the present disclosure.

Finally, the newly evenly dispersed solvent leaving the regulator disc 530 of flow governor 545 then proceeds to flow through a quad mesh disc 525 of the flow governor assembly 545, thus completing the calming and even redistribution of the incoming flow of pressurized solvent from the connector feed 540. As the solvent proceeds to flow through the quad mesh disc 525, the column of solvent 510 forms an even, flat solvent surface layer, otherwise known as a solvent flat-well. The solvent flat-well is a non-turbulent solvent surface well with a flat, linear surface layer that rises to meet the exposed surface area at the base of the bed of coffee grounds 505. Because the solvent flat-well is a rising well of non-turbulent solvent with a flat, linear surface layer, the solvent flat-well makes contact at the exposed base of the coffee grounds 505 across all 360° of the circumference of the coffee grounds 505 simultaneously, even as the solvent rises through the bed of coffee grounds 505 during the extraction process. The need for a solvent flat-well is absolutely critical for maximum hydraulic authority and preventing any form of channeling that may result in the boring of holes within the base or bed of packed coffee grounds 505, otherwise known as center holing. In the instance of channeling or the occurrence of center holing, an uneven distribution of hydraulic pressurization occurs, and thus weakening the hydraulic action and resulting in a poor extraction process.

Additionally, the area where the solvent flat-well first makes contact with the exposed surface of the dry coffee grounds 505 is known as the boundary layer 520. The boundary layer 520 is the dividing line between the leading edge of the rising solvent and the dry packed coffee grounds 505. With the formation of the solvent flat-well, the boundary layer strikes the entire base of the packed coffee grounds 505 simultaneously and evenly as the solvent flat-well and the boundary layer 520 proceeds to move up the extraction column 500. Consequently, the areas nearest boundary layer 520 are the area with the tightest hydraulic packing, then decreasing outward with the square of the distance. This is especially true since the boundary layer 520 is where packing of the coffee grounds 505 initially begins. However, because FIG. 5A illustrates only the very beginning stages of the extraction process, hydraulic compression of the coffee grounds 505 has only just begun to form at the boundary layer 520.

As the hydraulic pressure slowly increases near the boundary layer 520, a reactive layer 515 begins to form as more hydraulic pressure is applied at the boundary layer 520. Because the boundary layer 520 is the first point of extraction, not only is the boundary layer 520 and the reactive layer 515 the areas that are most reactive areas due to the frictional effects and thermal energy present at such areas, but the boundary layer 520 is where the pressure wave beings to form, which then spreads the generated energy to the reactive layer 515.

The pressure wave is an area where energy creators are catalyzed so that the energy generated is released and re-used to achieve a complete and efficient extraction. The pressure wave consists of a primary pressure wave and a secondary pressure wave. The primary pressure wave is a steady, slow moving pressurized front at the leading edge of the solvent flat-well, otherwise referred to as the boundary layer 520. The primary pressure wave both begins the wetting process and pressurization of the reactive layer 515 that triggers the release of carbon dioxide 555 and other trace gases. Such release of carbon dioxide 555 and other trace gases begins the swelling of the coffee grounds 505 and creates a coefficient of friction which holds the coffee grounds 505 against the walls of the extraction column 500. At the same time, the pressure wave builds a supply of potential energy in the solvent flat-well, while raising the level of static friction at the boundary layer 520 and the reactive layer 515, which aids in the holding of the coffee grounds 505 against the walls of the extraction column 500.

However, when hydraulic force in the solvent flat-well builds the reserve of potential energy underneath the base of the coffee grounds 505, the hydraulic force soon exceeds the static friction at the boundary layer 520 and the reactive layer 515. This critical tipping point, is called the skip trigger. It is where the hydraulic force exceeds the coefficient of friction locking the coffee grounds 505 in place against the extraction column 500, which now causes the coffee grounds 505 from the boundary layer 520 to the base of the bed coffee grounds 500 to skip or jump upward, which by way of example only, may range anywhere from 1 mm to 1 inch depending on the raw materials to be extracted and the size of the extraction column 500. As the coffee grounds 505 jump upward, the coffee grounds 505 proceed to reengage with the sides of the extraction column as static friction once again locks the coffee grounds 505 back in place. As the coffee grounds 505 reengage with the sides of the extraction column, the secondary pressure wave driven by inertia, continues to drive the solvent upward, further causing the solvent to slam into the base of the coffee grounds 505. This is further illustrated in FIG. 5A, which depicts a small, but growing reactive layer 515 due to the solvent driving into the coffee grounds 505. A more detailed description and application of the primary and secondary pressure wave with respect to the extraction column 500 is presented below. Additionally, the energy creators catalyzed during this process are naturally forming or occurring events whereby when force is applied, energy is released. Examples of such catalyzing energy creators are, but not limited to the following: static friction, dry friction, skin friction, fluid friction, potential energy, kinetic energy, mechanical energy, and mechanical wave energy and the water hammer effect.

More specifically, static friction is friction between two or more solid objects that are not moving relative to each other, such as the friction between the coffee grounds 505 and the interior walls or sides of the extraction column 500 at and beneath the boundary layer 520 at the beginning of the extraction process. The equation for static friction is the following: $F_s = \mu_s F_n$, where $F_s$ is static friction, $\mu_s$ is coefficient of static friction, and $F_n$ is normal force.

Dry friction resists relative lateral motion of two solid surfaces that are in contact. The equation for dry friction is the following: $F_f \leq \mu F_n$, where $F_f$ is the force of friction exerted by each surface, $\mu$ is the coefficient of friction, and $F_n$ is the normal force exerted perpendicular to each surface. Furthermore, skin friction is the friction between a fluid and the surface of a solid, such as raw materials to be extracted, moving through or between a moving fluid. The equation for skin friction is the following:

$$Re = \frac{VL}{v},$$

where V is flow velocity, L is flow traveling distance, and v is fluid kinematic viscosity.

In regards to potential energy, potential energy is the energy which results from position or configuration, such that the object may have a capacity for doing work as a result of its position in a gravitation field. The equation for potential energy is the following:

$$k = -\frac{F_r}{L - L_o},$$

where k is Hook's Law, L is deformed length, $L_o$ is the un-deformed length, and $F_r$ is the restoring force. Kinetic energy on the other hand, is the energy of an object due its motion. Kinetic energy may be represented by the following:

$$K.E. = \frac{1}{2}mv^2,$$

where K.E. is kinetic energy, m is mass, and v is velocity. The total mechanical energy of an object is the sum of the kinetic energy and potential energy. As such, the formula for mechanical energy is represented as the following: $E_{mechanical} = U + K$.

Lastly, mechanical wave energy is a wave that is produced with the oscillation of matter, and therefore transfers energy through a medium as a result. As such, mechanical wave energy may be present within the dry bed of coffee grounds 505 that as the coffee grounds become compressed. The mechanical wave energy formula is the following: $v = \lambda f$, where v is velocity of the wave, $\lambda$ is the wavelength, and f is the wave frequency.

Referring back to when the extraction first begins as illustrated in FIG. 5A, there is minimal reactivity in the reactive layer 515 as a result of minimal hydraulic forces present thus far. However, as the reaction proceeds generally, the further compression of the coffee grounds 505 begins to catalyze energy creators using both mechanical and frictional forces that is then converted to thermal energy. This then sets into motion the process of generating a self-sustaining and self-perpetuating thermal reaction, otherwise known as the catalyzing pressure wave cycle. More specifically, the catalyzing pressure wave cycle is a carefully calculated and controlled moving front of pressurized solvent, which forms at the leading edge of the solvent flat-well, and may take two forms—a primary pressure wave and a secondary pressure wave. The primary pressure wave is a steady-state, slow moving pressurized front at the leading edge of the solvent flat-well. As it slowly progresses up through the extraction column 500, the primary pressure wave begins the wetting and saturating of the coffee grounds 505 to begin the catalyzation of the natural energy creators found within the extraction process of solid-liquid extractions. To catalyze such an extraction process, a measured and steady application of hydraulic pressure is required, which simultaneously builds potential energy in the solvent well, and also builds sliding, fluid, and static friction at the boundary layer. The secondary pressure wave follows the primary pressure wave, which will be explained in greater detail below.

FIG. 5B illustrates a cross-sectional side view of an extraction column 500 at a more mature stage of the extraction process as hydraulic compression continues to build within the extraction column 500, as consistent with embodiments disclosed herein. As illustrated, hydraulic packing has begun to compress the entire bed of coffee grounds 505 upward, as further indicated by the rising solvent column 510, which also includes the lower portion of the already saturated coffee grounds 505 extending from the base of the bed of coffee grounds 505 to the boundary layer 520. The darker shading of the coffee grounds 505 is also indicative of greater compression, as illustrated in FIG. 5B. Particularly, the thicker and darker shading at the reactive layer 515 is also a clear indicator that greater hydraulic packing and compression has occurred relative to the beginning stage of the extraction process, as compared to FIG. 5A. Additionally, it is at the boundary layer 520 and the reactive layer 515 where the catalyzing pressure wave cycle begins the self-sustaining thermal reaction, as described in further detail below.

As greater hydraulic compression is applied to the coffee grounds 505, out-gassing may occur at areas where there is the greatest amount of pressure, such as the boundary layer 520 and the reactive layer 515. As the leading edge of the solvent flat-well 515 first penetrates the coffee grounds 505 at the boundary layer 520, small amounts of carbon dioxide 555 gas off. While traditional extraction methods simply release the generated carbon dioxide 555 out of the extraction column 500, this is a tremendous waste of potential energy that can be re-used or recycled to generate another form of useful energy, such as mechanical, frictional or thermal energy. As such, embodiments of the present disclosure contain and catalyze the generated carbon dioxide 555 within the sealed extraction column 500, aiding in the process of closing off the interstitial spaces and low resistance migration travel ways in the coffee bed while raising the surrounding thermal temperatures. This further aids in compressing the coffee grounds 505 so that the extraction process may proceed. Additionally, the carbon dioxide 555 initially released through the forced off-gassing from hydraulic compression is further catalyzed from the frictional heating. As with the other various forms of energy released from the afore-mentioned energy creators, energy within the reactive layer 515 is converted to heat energy through the process of thermodynamics, which then causes the off-gassing of carbon dioxide 555 to expand. The expanding carbon dioxide 555 compresses the surrounding coffee grounds 505 much more effectively.

As the generated thermal heat causes the carbon dioxide 555 to expand outward aggressively, the coffee grounds 505 are pushed and compressed in all directions. More specifically, the compression from the carbon dioxide 555 closes off a greater number of interstitial spaces and low resistance migration travel ways, and particularly causes the coffee grounds 505 to be pressed more tightly against the sides of the extraction vessel 500, as indicated by the arrows 555 in FIGS. 5B and 5C. As this lateral expansion builds and pushes, the coefficient of friction between the coffee grounds 505 in the reactive layer 515 and areas nearest the boundary layer 520 and the sides of the extraction vessel 500 drastically increases, thereby locking the coffee grounds 505 near the reactive layer 515 and the areas nearest the boundary layer 520 against the sides of the extraction column 500. As the compressed coffee grounds 505 are forced against the sides of the extraction column 500, static friction holds the coffee grounds in place while simultaneously releasing thermal energy at the reactive layer 515, further resulting in the building of a stronger coefficient of friction.

Even as the steady pressure of hydraulics is applied, the coefficient of friction holds the bed of coffee grounds 505 in place, which then further increases the potential energy buildup in the solvent flat-well while increasing static friction and thermal heating in the reactive zone 515. This further increases back pressure and resistance, which subsequently causes hydraulic pressure to increase in the solvent flat-well until it exceeds the coefficient of friction formed between the compressed coffee grounds 505 and the extraction column 500. This is further evidenced by the thicker and darker shading in the reactive layer 515.

Soon, the potential energy in the solvent flat-well and at the boundary layer 520 overcomes the coefficient of friction between the coffee grounds 505 and the sides of the extraction column 500 nearest the boundary layer 520, otherwise known as a skip trigger. In other words, the skip trigger is the tipping point where hydraulic force from underneath the solvent flat-well exceeds the coefficient of friction locking the coffee grounds 505 against the sides of the extraction column 500. When this tipping point is reached and the coefficient of friction is exceeded, the locked column of packed coffee grounds 505 being held against the sides of the extraction column near the reactive zone 515 and everything extending beneath it is released. This causes the coffee grounds 505 near the reactive zone and everything extended beneath it to jump upward with explosive force, which can be heard audibly and felt to the touch. As a result, large and sudden bursts of energy in the form of kinetic energy, mechanical energy, mechanical wave energy, fluid friction, sliding friction, and dry friction is immediately catalyzed and released.

Consequently, while the coffee grounds 505 reengage the sides of the extraction column 500 after a skip trigger event, the boundary layer 520 does not stop, which results in the secondary pressure wave. This is due to the inertia built within the moving solvent flat-well propelled by the hydraulic force behind it. Such hydraulic force, or power at the leading edge of the boundary layer 520, slams hard and deep into the already tightly compressed coffee grounds 505. This rapid impact of solvent suddenly slamming into the coffee grounds 505 is also known as the water hammer effect resulting from the secondary pressure wave.

The energy released from the water hammer effect is tremendous. As a result, short, but immense bursts of thermal energy are released, both into the boundary layer 520, and the reactive layer 515 due to the following: dry friction as the coffee grounds 505 move closer and rub against each other, fluid friction as a result of the column of solvent 510 pushing through the coffee grounds 505, and sliding friction as a result of the hydraulic force pushing the boundary layer 510 and the coffee grounds 505 upward. Additionally, mechanical energy as the coffee grounds 505 are moved around, and mechanical wave energy as oscillations may be present within the dry bed of compressed coffee grounds 505.

With the solvent deeply penetrating into the coffee grounds 505, immense bursts of thermal energy as a result of the water hammer effect from the secondary pressure wave, are released from the bed of coffee grounds 505, as further illustrated by the larger arrows in FIG. 5C, as compared to FIG. 5B. As a result of the immense frictional heating, the gases in the reactive layer 515 expand outward, decreasing with the square of the distance. This helps in compressing the coffee grounds 505 in the reactive zone 515, which also decreases outward with the square of the distance, and further prepares the raw material for a subsequent catalyzation cycle, which will always be stronger than the preceding one until the catalyzing pressure wave cycle plateaus, which will be explained in more detail below.

More specifically, as further illustrated in FIG. 5C, the catalyzing pressure wave cycle is nearing the plateauing stage. With both the primary and secondary pressure waves peaking, massive amounts of wetted and frictionally heated coffee grounds 505 are beginning to swell and reach saturation, thus allowing the coffee grounds 505 to be ripe for extracting. As the secondary pressure wave slams into the wetted bed of swollen coffee grounds 505 in the reactive layer 515, most of the interstitial spaces and low resistance migration travel ways are now closed. As a result, the solvent from the secondary pressure wave is driven directly into the coffee grounds 505. This immediately causes the coffee grounds 505 to become super-saturated as the pressure inside the coffee grounds 505 now equalizes with the ambient pressure outside the coffee grounds 505, which indicates that the coffee grounds 505 have reached equilibrium and are now fully extractable.

By way of example only, the secondary pressure of the catalyzing pressure wave cycle is where the skip trigger event and the immediately following water hammer effect continues over and over again at the reactive layer 515, wherein each successive cycle is stronger than the last. During each cycle, the necessary environment is created within the extraction process, such that more energy is generated than required to continuously perpetuate the succeeding cycle, thereby causing each cycle to be stronger than the last. Temperatures are generated naturally by the catalyzing energy creators within the extraction process, which utilizes the process of thermodynamics to achieve the proper solubilization and mass transfer temperature ranges. By way of example only, the solubilization and mass transfer temperatures may be in the range of 196° to 204° Fahrenheit. The solubilization and mass transfer window is when there is sufficient energy within the critical thermal zone generated from the catalyzing pressure wave cycle, and it is within this solubilization and mass transfer window where all the volatiles, solids, and constituents of the raw materials are extracted.

When the solubilization and mass transfer temperature window is achieved, a full and complete extraction will now take place as the boundary layer 520 proceeds to move up the extraction column 500. It should be noted that this intended thermal spike at the solubilization and mass transfer window only lasts long enough to heat-charge the coffee grounds 505, open the cell walls, and drive the solvent into the bed of coffee grounds 505 so that the raw materials first catalyze, then achieve a state of equilibrium with the solvent. By doing so, the extraction process is able to draw out all of the available soluble solids, volatile aromatic compounds, and constituents during this solubilization and mass transfer temperature window.

Furthermore, the primary pressure wave of the catalyzing pressure wave cycle may continue to move up the column, prime the raw material, build the necessary static friction at the boundary layer, and build the necessary potential energy in the solvent flat-well to achieve the skip trigger event that brings about the secondary pressure wave of the successive water hammer effect over and over again until the catalyzing pressure wave cycle plateaus. By way of example only, the catalyzing pressure wave cycle may plateau when the rise of the hydraulic pressure in the extraction column 500 equals a predetermined or preset pressure range as set by the pressure regulator, pump controller and/or the inlet valves outside the extraction column 500. When the boundary layer 510 equals the predetermined pressure range, the catalyzing pressure wave cycle then stabilizes and does not get stronger and instead, maintains the same pressure throughout the duration of the extraction.

This further means that when the predetermined pressure is achieved within the extraction column 500, the heaviest pressure wave activity is now occurring at the reactive layer 515, where the greatest reactivity, greatest water hammer affect, and total energy is being released. By way of example, the overall energy, which is repeatedly catalyzed and released, may include, but is not limited to the following: potential energy, kinetic energy, sliding friction, fluid friction, inertial impact energy, mechanical energy, and mechanical wave energy and the water hammer affect. This is further illustrated in FIG. 5C, where the darker coloration of the coffee grinds 505 indicates heaviest expansion, compression, and hydraulic compression with respect to the more beginning stages of the extraction process, with respect to FIGS. 5A and 5B.

However, while the ideal temperature for extraction is within the high temperature range of the raw material's solubilization and mass temperature range, this same temperature range that does the best extracting, may also do the most damage. This is true when the raw materials are exposed to such high temperatures for an extended amount of time, which results in most, if not all, of the delicate volatile aromatics, compounds, and constituents to be degraded or destroyed. Conversely, the current extraction process and extraction column 500 utilizes the high temperature range of the raw material's solubilization and mass temperature window for only a few fractions of a second before the heat begins dissipating, which allows sufficient time to promulgate extraction. However, because this temperature window lasts only for a few fractions of a second, there is insufficient amount of time to do any damage to the coffee grounds 505.

As a result, in accordance with some embodiments, the extraction column 500 is configured to include a trailing cool wave 550 that follows immediately behind the boundary layer 520 in order to further avoid excessive and prolonged heating in the reactive zone as extractive heat temperatures begin dissipating. This is a critical component of the extraction technology because the cool wave 550 immediately cools the delicate compounds and constituents immediately extracted in the solubilization and mass temperature range at the boundary layer 520. As stated above, allowing the extraction column 500 to attain the solubilization and mass temperature range is crucial in order to effectively extract all the constituents and compounds or any heat sensitive compounds from the coffee grounds 505. However, in order prevent the extracted constituents and compounds from being degraded or destroyed by the high temperatures, a cool wave 550 that stems from the solvent flat-well is utilized to immediately cool the extracted compounds in the reactive zone 515 from the exposure to such high temperatures. As such, the cool wave 550 helps preserve the delicate heat sensitive compounds within the same vessel where the catalyzing pressure wave cycle is performed, thus eliminating the need for a separate vessel attached to further cool the extracted effluent. Therefore, immediately following the thermal energy generated from the catalyzing pressure wave cycle, the solvent flat-well follows directly behind the reactive zone 515 and the boundary layer 520 cools the extracted compounds, thus allowing the heated extracted effluent to be in immediate contact with the cooler solvent. Through this design, the necessary compounds within the coffee grounds 505, or other raw materials, are extracted and also further protected from heat degradation.

As the cool wave 550 trails behind the boundary layer 520, the coffee grounds 505 in the reactive zone 515 are now seeped in the cooler solvent. Just seconds before, the area of the cool wave 550 was the areas where the primary and secondary pressure wave initially extracted the volatile aromatics, compounds, and constituents from the coffee grounds 505. Because of the primary and secondary pressure wave, the coffee grounds 505 are heated, swollen with their cell walls opened, and super-saturated, the coffee grounds 505 are able to be extracted at the peak of the bell curve. Post extraction with the primary and secondary pressure wave, the swollen and super-saturated coffee grounds are now immersed in the cool zone 560 and remain swollen and in the state of equilibrium. Thus, now with the extended residence time, it further allows any remaining compounds within the super-saturated coffee grounds 560 to be further extracted. As such, any remaining compounds that are extractable below the solubilization and mass transfer temperature window are extracted here in this second extraction area. This second extraction utilizing the cool wave 550 may run simultaneously with the primary extraction utilizing the primary and secondary pressure wave occurring above at the boundary layer, thus allowing two simultaneous extractions to take place within a single extraction column 500. This simultaneous second extraction with the cooler solvent greatly adds to the efficiency of the extraction due to the combining of both heat sensitive and non-heat sensitive extractions in one singular extraction column. Moreover, it combines the broadest possible range of constituents from virtually every extractable temperature of the spectrum, creating the most flavorful and robust coffee possible.

An indication that the extraction has worked correctly may occur upon the visual inspection of the bed of coffee grounds 505. If the bed of coffee grounds 505 is hydraulically compressed to approximately 85% of its original size, it is a good indication that the extraction process was successful. This visual inspection is possible when using the transparent Lexan polycarbonate constructed vessel. If the vessel is made of 316 L stainless steel, other factors may be used to check the progress of the extraction process. These factors may consist of measuring flow rate through a digital flow meter, counting the number of skip-triggers reached per minute, or placing one's hand over the external portion of the stainless steel extraction column 500 in the approximate area of the audible pressure wave activity. In this general area, a portion of the internal temperature activity is transferred to the outer portion of the extraction column 500 through the process of conduction. In such cases, temperature conversion may be used to convert the temperature that is felt externally and apply it to what is actually occurring internally. Other materials not listed here may be used as appreciated by one of ordinary skill in the art. Furthermore, other indicators may be used to check the progress of an extraction based on the material of the extraction column 500 used.

FIG. 6 illustrates a cross-sectional side view of the rising flow of solvent impacting into the bed of raw materials as the extraction progresses, consistent with embodiments disclosed herein. Accordingly, FIGS. 6A-6D depict the beginning stages of the extraction process until it matures and reaches a plateau, where the extraction then proceeds to completion.

Referring to FIG. 6A, the extraction column 600a is currently undergoing the initial and priming phase of the extraction process as the solvent 615 first enters through the connector feed 602 and into the extraction column 600a. This is evident by the lack of hydraulic pressure forming at the reactive layer 625, as indicated by the almost complete lack of dark shading in the reactive layer 625 along with the boundary line 610, which is consistent with the very little hydraulic compression present.

Referring to FIG. 6B, the extraction column 600b undergoes its first skip-trigger point 635. The first skip-trigger event 635 occurs when the hydraulic pressure forming in the solvent flat well builds until it overcomes the coefficient of friction of the compressed coffee ground bed 605b and the inner walls of the extraction column 600b. Thus, until the hydraulic pressure within the solvent flat-well overcomes the coefficient of friction, static friction continues to build tension at the boundary layer 610 as the solvent flat-well of the rising flow of solvent 615 steadily applies pressure against the base of the coffee ground bed 605b until the friction coefficient is exceeded. At that moment, when the skip-trigger is reached, the coefficient of friction is exceeded, and the coffee ground bed 605b breaks free from the sides of the extraction column 600b. The secondary pressure wave is now unconfined, as hydraulic pressure forcefully drives it upward and pushes the coffee ground bed 605b upward in a sudden and violent burst. More specifically, when the skip-trigger is reached, the coffee ground bed 605b abruptly skips, or jumps upward as fluid friction, sliding friction, kinetic energy, mechanical energy and mechanical wave energy is released as a result of the upward jump. In addition, fluid friction and sliding friction will also take place, thus releasing energy in the form of thermal energy.

While the coffee ground bed 605b moves upward violently, it is also yanked to stop violently and abruptly as the coefficient of friction reengages. However, although the ground coffee bed 605b comes to a stop, based on Isaac Newton's first law of motion, the rising solvent 615 underneath wants to keep moving and slam into the abruptly stopped coffee ground bed 605b when the coefficient of friction of the coffee grounds and the walls of the extraction column 600b reengages, otherwise known as the water hammer effect 620 brought on by the secondary pressure wave. As a result, the coffee ground bed 605b may be further compressed, as further depicted by the darker shading of the coffee grounds, especially at the reactive layer 625. Additionally, this sudden upward implosion of the secondary pressure wave or the water hammer effect 620 creates a sudden, but tremendous burst of thermal energy at reactive layer 625, as further indicated by the darker shading and thicker size in comparison to FIG. 6A.

The release of the thermal energy from the first water hammer effect 620 of the secondary pressure wave further feeds into the overall catalyzing pressure wave cycle, as further illustrated in FIG. 6C. Once the catalyzing pressure wave cycle is underway, each successive catalyzing sequence becomes stronger. Energy creators have been catalyzed, and larger amounts of carbon dioxide are released with each new catalyzing sequence, which in turn becomes thermally heated to higher and higher temperatures causing greater expansion and thereby causing greater compression of the coffee grounds. The coefficient of friction against the extraction column 600c becomes stronger each time and locks the coffee ground bed 605c tighter as greater resistance and back pressure is created. This in turn increases hydraulic force in the solvent well, which eventually will reach the skip-trigger point 645 and break the coefficient of friction to begin the next catalyzing cycle once again. At that point, the successive water hammer effect 650 then penetrates even more deeply each time it slams into the coffee ground bed 605c, releasing more energy each time as it does so, until the catalyzing pressure wave cycle plateaus. This sequence of events can be seen by the thicker reactive layer 625 and heavier compression of the coffee ground bed 605c as indicated by the darker shading.

As further illustrated in FIG. 6D, the pressure wave cycle is fully under way and matured. The coffee grounds in the coffee ground bed 600d are further compressed with each additional skip trigger point 655 and water hammer effect 660, as further indicated by the significant darker shading of the coffee grounds. More specifically, the progression of the darker shading nearest the boundary layer 610 and the reactive layer 625 is a result of the increased packing compressibility of the coffee grounds. The packing compressibility decreases with the square of the distance from the point of impact. As such, only the coffee grounds nearest the areas of greatest compression is tightly packed, as indicated by the darker shading. Furthermore, the lesser dark shading indicates less compression with the square of the distance from the boundary layer 610 and the reactive layer 625, which results in the coffee grounds being relatively more loose or less compact in comparison. This is critical to prevent subsequent over compression. Again, the catalyzing pressure wave cycle continues with a third skip trigger point 655 and a water hammer effect 660 as the boundary layer 610 again, forcefully pushes into the base of the coffee grounds. Additionally, the catalyzing pressure wave cycle matures with each additional skip-trigger point and water hammer effect, where greater thermal energy is also released at the reactive layer 625 with each successive catalyzing pressure wave cycle until a plateau point is achieved, as discussed above in detail.

Once the pressure wave cycle has plateaued and has reached its peak catalyzing ability, the pressure wave cycle will remain in this state throughout the duration of the extraction process. At this juncture, all the interstitial spaces and low resistance migration travel ways have been closed and the contained resistance and backpressure is now at its peak. As a result, hydraulic pressure is also at its highest, therefore, the extraction process reaches its peak solubilization and mass transfer temperature threshold. As viewed through one of the transparent Lexan polycarbonate benchtop extraction column 600 models, the maturation sequence of the pressure-wave process can be evidenced by the increase in volume of the solvent flat-well. This is because when a proper pressure-wave extraction nears its completion, the entire coffee ground bed 605d will be compressed to nearly 85% of its original size. Consequently, this leaves more room for the solvent flat-well 615 to be visible.

FIG. 7 illustrates an exploded view of a flow governor assembly 700 in an extraction column 702, consistent with embodiments disclosed herein. In one particular embodiment, the flow governor assembly 700 includes 3 discs to help control the flow of incoming solvent entering the base of the extraction column 702. In some embodiments, the 3 discs may further be separated by 2 mm to 3 mm spacers (not shown here) to allow for adequate flow to occur between the discs. The first disc 745 may contain perforations 755, 760 in a symmetrical fashion to allow the solvent to enter the base of the extraction column 702 via the perforations 755, 760 of the flow governor assembly 700. By way of example only, the perforations 755, 760 may be configured in a symmetrical fashion to allow a significant amount of solvent to flow through while also providing a sufficient barrier so as to contain the bulk of turbulence and prevent the surging solvent from entering and rising up through the extraction column 702 and into the bed of raw materials, as further illustrated by the circular arrows at the base of the extraction column 702.

Additionally, the first disc 745 may include perforation 755, 760 that are slightly more concentrated towards the center of the first 745 disc. By doing so, the flow of the solvent is slightly more concentrated towards the middle of the extraction column 700, as further indicated by the larger sized perforations 760. This may assist with the centering of hydraulic force and pressure as more flow of pressurized solvent passes through the middle of the first disc 745. Centering the hydraulic force and pressure is important since the solvent naturally has a tendency to seek the point of least resistance and will thus travel towards the side of the vessel. In event of such an occurrence, the solvent may fail to even extract all or most of the raw material located at the center of the extraction column 702, resulting in an incomplete and poor extraction of the raw materials. Additionally, the concentrating of solvent towards the middle of the extraction column 700 may also help contain and retain as much energy from the flow of solvent entering the base of the extraction column 702, while also simultaneously having sufficient surface area to act as a barrier to limit the turbulence from reaching the bed of coffee grounds. As any obstruction of the flow of solvent accumulatively adds resistance to the flow and reduces energy, the amount of allowable perforations and solid surface area to provide a solid barrier for resistance may be manipulated by increasing the amount and size of perforations 755, 760 placed on the first disc 745.

In some embodiments, a second disc 725 may be placed behind the first disc 745 of the flow governor assembly 700. The second disc 725 may contain slits 735, 740 for the solvent to pass through, thus further breaking apart any turbulence and surging of the solvent remaining after passing through the first disc 745. The slits 735, 740 may have a different shape than the perforations 755, 760 from the first disc 745 in order to further ensure that the turbulent solvent is effectively deconstructed. Furthermore, because the slits 735, 740 have a different pattern than that the perforations 755, 760 of the first disc 745, it effectively ensures that the slit pattern breaks up the solvent that is passed through the round perforation pattern of the first disc. As such, the slit pattern effectively ensures that the there is a deliberate misalignment of solvent transitioning from one disc to another. There are a number of equations to establish orifice size vs flow rate for the round sharp edged orifices. For example:

$$P1-P2<FL2\cdot(P1-FF\cdot P) \rightarrow Qw=0.0865\cdot C\cdot(do/0.0153)$$
$$2\cdot\sqrt{P1-P2}/SG$$

$$P1-P2>FL2\cdot(P1-FF\cdot P) \rightarrow Qw=0.0865\cdot C\cdot(do/0.0153)$$
$$2\cdot\sqrt{P1-P2/SG}\times FL\cdot\sqrt{P1-FF\cdot P/SG,}$$

where P1: Primary pressure (psia); P2: Secondary pressure (psia); do: Diameter Of orifice (in); C: discharge coefficient; Qw: h2o flow rate (gal/hr); FL: Pressure recovery factor (=0.9); FF=Critical pressure ratio factor; P: Absolute vapor pressure of solvent at inlet temp (psia); and SG: h2o gravity (lbs/ft3)

In some embodiments, the slits 735, 740 may be symmetrical and further configured so that slightly more of the concentrated solvent passes through the middle portion of the second disc 725. Because solvent naturally has a tendency to seek the point of least resistance and is likely to travel towards and up the side of the extraction column 702, having more of the slits 735, 740 slightly more concentrated towards the middle of the second disc 725 may further assist in centering the flow of hydraulic pressure and force towards the middle of the extraction column 700.

In some embodiments, a third disc 705 may be placed behind the second disc 725 of the flow governor assembly 700. The third disc 705 may contain perforations 715, 720 which allow the solvent to exit the flow governor assembly 700 in a smooth, even, and flat flow pattern, otherwise known as a solvent flat-well 704. Again, perforations 715, 720 are placed on the third disc 705 instead of a slit pattern on the second disc 725 in order to ensure that the turbulent solvent is effectively deconstructed. More specifically, the solvent flat-well 704 is an even distribution of solvent so that it is able to make contact with the surface of the packed raw materials simultaneously and evenly. This solvent flat-well 704 helps ensure that the optimal hydraulic execution of extracting of raw materials is available as the solvent flat-well 704 evenly rises up the extraction column 700. Additionally, the perforations 715, 720 may be symmetrically placed and be configured so that more of the solvent passes through the middle portion of the disc. Because solvent naturally has a tendency to seek the point of least resistant and is likely to travel towards the side of the extraction column 702, having more of the perforations 715, 720 slightly more concentrated towards the middle of the third disc 705 may further assist in centering the flow of hydraulic pressure and force towards the middle.

Additionally, in some embodiments, the first disc 745, second disc 725, and third disc 705 may each include a misalignment marker 750, 730, 710. The misalignment marker 750, 730, 710 may be configured to ensure that each of the discs 745, 725, 710 line up and that the corresponding perforations and slits are properly misaligned or offset so that the flow patterns of the slits and perforations do not effectively line up with each other. This may further ensure that the incoming flow of pressurized solvent is further deconstructed as it passes through the misaligned slits perforations and slits on each corresponding discs 745, 725, 705.

Furthermore, by way of example only, the first disc 745, second disc 725, and third disc 705 may be made of 316 L stainless steel or any other appropriately hard, high tensile strength material suitable to withstand the pressures contained within the extraction column. In other instances, the first disc 745, second disc 725, and third disc 705 may be made Lexan polycarbonate for a smaller extraction column 702, such as one to be placed on a bench top.

FIG. 8 illustrates a perspective view of a limiter disc 800, consistent with embodiments disclosed herein. As illustrated, the limiter disc 800 includes perforations 805 configured to allow the extracted effluent to leave the extraction column by first passing through the limiter disc 800. Additionally, the limiter disc 800 may act as a barrier that keeps the raw materials beneath it packed within the extraction column. By way of example only, the limiter disc 800 may be made of 316 L stainless steel or any other appropriately hard, high tensile strength material suitable for the pressures contained within the extraction column.

Additionally, in some embodiments, the limiter disc 800 is configured to work in conjunction with the flow governor assembly (not shown here). By way of example, the limiter disc 800 may control the flow ratio of the extracted effluent exiting the extraction column with respect to the flow governor assembly, such that the rate of solvent entering the extraction column is controlled by the flow governor assembly and the rate of extracted effluent leaving the extraction column is controlled by the limiter disc 800. Accordingly, the limiter disc 800 may be configured such that there is a 1:2 ratio relationship with respect to the flow governor. Conversely, the flow governor assembly will have a 2:1 ratio relationship with respect to the limiter disc. This ratio imbalance will allow twice the flow of solvent to enter the extraction vessel 900 than the limiter disc 800 is able to release the extracted effluent out of the extraction vessel. However, it should be noted that other ratios may be used, such as 3:1, 4:1, and 6:1 by way of example only. When creating the selected ratio between the flow governor assembly and the limiter disc 800, the number and size of the slots or perforations on the corresponding flow governor assembly and the limiter disc 800 may be manipulated to regulate and control the flow rate. The equations to establish orifice size vs flow rate for the round sharp edged orifices are similar to the ones as discussed above with respect to the flow governor assembly.

To further illustrate the importance of the flow governor assembly 950 and the limiter disc 970, FIG. 9 illustrates a cross-sectional side view comparison of an extraction column with and without a flow governor assembly or a limiter disc, consistent with embodiments disclosed herein. As such, FIGS. 9a and 9b will be explained in conjunction with one another. More specifically, FIG. 9a illustrates an extraction column 900a without a flow governor assembly or a limiter disc and instead, merely includes a single perforated disc 910 at the base of the extraction column 900a. Because a flow governor assembly is not included, there is unobstructed and uncontrolled flow of solvent entering the base of the extraction column 900a. Consequently, as a result, the impact of not having a flow governor assembly is immediately present. For example, a center holing or surge 915 of solvent is immediately present, which results in the bulk of hydraulic force driving up the middle of the extraction column 900a. As further highlighted by the arrows, the pressure is focused unevenly as most of the pressure is concentrated in the center areas of the extraction column 900a and progressively weakens toward the peripheral areas of the extraction column 900a. With the majority of the pressures and force pushing up unevenly towards the center, the weakened and warped boundary layer cannot establish a proper upward hydraulic compression of the raw materials within the extraction column 900a. Thus, the interstitial spaces or low resistance migration travel ways are unable to effectively close, resulting in a very poor extraction of raw materials.

More specifically, as a result of a missing flow governor assembly, there is a lack of effective energy present in the upper portions of the extraction column, which unfortunately results in a significant amount of extractable raw materials to remain un-extracted. These low energy areas are often referred to as culls 930. Culls 930 are essentially small, extremely low energy pockets of raw materials that are virtually impossible to extract unless the areas surrounding the low energy pockets are recharged. If these culls do not become recharged, the raw materials in such areas will go un-extracted, which further results in the an incomplete and poor extraction of the raw materials.

However, as discussed above, the limiter disc 970 may be configured to work in conjunction with the flow governor assembly 950 to create a pressure differential, which then may provide sufficient energy to re-energize the culls 930 so that all the raw materials within the extraction column 900 are extracted. For comparison purposes with FIG. 9A, FIG. 9B further illustrates a cross-sectional side view of an extraction column with a flow governor assembly 950 and a limiter disc 970, consistent with embodiments disclosed herein. Because the extraction column 900b in FIG. 9B includes a flow governor assembly 950, the effective formation of the center holing or surge of solvent as depicted in FIG. 9A is completely prevented. Instead, with the application and incorporation of the flow governor assembly 950, there is a flat, even, and non-turbulent distribution of fluid and continues to remain so until the completion of the extraction process, as further indicated by the arrows above the flow governor assembly 950.

Additionally, FIG. 9B further illustrates a controlled flow as the flow governor assembly 950 controls the rate of solvent entering the base of the extraction column 900b and the limiter disc 970 controls the rate of extracted effluent leaving the extraction column 900b. By way of example only, the rate of controlled flow may be 2:1, so that the rate of incoming flow of solvent is twice the rate of the flow of extracted effluent exiting the extraction column 900b. With the use and manipulation of the controlled flow within the extraction column 900b, the presence of culls are eliminated, as compared to FIG. 9A. This is because only so much extracted effluent can enter and flow through the perforations of the limiter disc 940 to exit the extraction column 900. As such, any extracted effluent near the limiter disc 940 not able to escape through the perforations of the limiter disc 940 is then redirected downward towards the lower energy culls of the extraction column 900 due to the flow and pressure differentials created, as represented by the arrows 960. The redirected flow of pressurized extracted effluent provides enough energy to recharge any culls located at the upper portion of the extraction column 900b. The culls are then effectively eliminated because redirecting of the extracted effluent back down the extraction column results in a boost of energy, which further allows the raw materials in the culls to become extracted. As such, a very effective and efficient extraction process is created throughout the entire vessel with the use of the flow governor assembly 950 and the limiter disc 970.

FIG. 10 illustrates three different pressure gradients that result in three different flavor profiles and intensities from extracted effluent, consistent with embodiments disclosed herein. More specifically, the strength of the pressure-wave may be manipulated based on the applied pressure gradient of the raw materials packed within the extraction column. Consequently, the applied strength of the pressure wave may be manipulated to obtain different flavor profiles or flavor intensities from the extracted raw materials, such as coffee beans by way of example only. As described in detail above, the pressure wave in the catalyzing pressure wave cycle may reach a predetermined pressure or preset pressure range as set by the pressure regulator or pump controller outside the extraction column 1000. Thus, when the extraction column 1000 reaches this predetermined pressure, the extraction column 1000 may maintain this pressure until the end of the extraction process.

As illustrated in FIG. 10A, the extraction column 1000a is an exemplary illustration of a light pressure gradient profile exerted on the packed coffee ground bed 1030. The light shading at the base of the extraction column 1000a indicates the presence of a light pressure gradient. More specifically, the light pressure gradient may be generated from the lightly pressurized solvent 1010a entering the base of the extraction column 1000a. As the solvent 1010a enters through the flow governor 1020, the solvent 1010a penetrating the coffee ground bed 1030 is met with fairly light pressure. Furthermore, as a result of the light application of pressure, the compression of the coffee ground bed 1030 will be more loose when compared to a coffee ground bed 1030 that is compressed with stronger pressure application. Consequently, the coffee ground bed 1030 with a somewhat weaker or lighter pressure gradient will result in a slightly more open arrangement of interstitial spacing since a lighter compression is applied to the coffee ground bed 1030, which in turn, may result in a slightly lower solubilization and mass transfer temperature window. This may result in a milder flavor profile.

With regards to FIG. 10B, the extraction column 1000b is an exemplary illustration of a heavier pressure gradient applied to the coffee ground bed 1040. This is indicated by the larger arrow of the pressurized solvent 1010b entering the base of the extraction column 1000b under higher pressure. Once again, the pressurized solvent 1010b passes through the flow governor 1020 and penetrates the base of the coffee ground bed 1040. However, FIG. 10B indicates the presence of a heavier pressure gradient as a result of the base of the coffee bed 1040 being raised upward from the base of the extraction column 1000b, and solvent penetration into the reactive layer. This is indicative of heavier hydraulic compression and further results in the coffee grounds to be more compact and closer together. As a result, this eliminates excess interstitial spaces and low resistance migration travel ways as the coffee grounds are compressed more closer and upward within the extraction column 1000b.

Additionally, the result of this process not only allows for a more successful extraction due to the heavier coffee ground saturation with the application of a heavier pressure gradient, but it further allows the pressurized solvent 1010b to extract more compounds and constituents from the coffee grounds. Additionally, the process of further compressing the coffee ground bed 1040 results in heavier frictional heating, which consequently leads to raising the solvent 1010b temperature within the extraction column 1000b. Thus, when the solvent temperature approaches solubilization and mass transfer window within the thermal critical zone, which may include a range of 196 degrees to 204 degrees Fahrenheit, virtually all of the volatile aromatic heat sensitive compounds and constituencies may be extracted. Moreover, due to the increased catalyzing coefficients and higher levels of subsequent friction, the thermal dynamic return may be higher as well, exceeding normal temperature standards and heavier hydraulic compression. As a result, there is a propensity to develop darker and stronger flavor profile of the extracted coffee from the coffee grounds.

Additionally, by way of example only, FIG. 10C is an illustration of a more intense and stronger pressure gradient applied to the coffee ground bed 1050. This is indicated by the larger arrow of the pressurized solvent 1010c entering the base of the extraction column 1000c under higher pressure. Again, the pressurized solvent 1010c enters the base of the extraction column 1000c via the flow governor assembly 1020 and rises up the extraction column 1000c.

Another indication that a stronger pressure gradient applied is due to the greater compression of the coffee ground bed 1050, as further indicated by the darker shading of the coffee ground bed 1050, as well as extensive solvent penetration into the reactive layer as shown by the three black arrows inside the solvent flat-well. Because these coffee grounds are more tightly compressed than the coffee grounds in either FIG. 10A or 10B, the coffee grounds are further packed together in an extremely confined space, thus eliminating virtually any residual interstitial spaces within the ground bed 1050. All low migration travel-ways are closed as well causing heavy upward force of the pressurized solvent 1010c into the coffee ground bed 1050. Resultantly, this raises the coffee ground bed 1050 to its maximum height from the base of the extraction column 1000c. Once again, just as with FIG. 10B, FIG. 10C develops a much higher pressure gradient results in intense catalyzing pressure wave activity, which fosters maximum accessibility of all available compounds and constituents to be extracted from the coffee grounds, and at a much higher temperature threshold than standard. As a result, with such intensive temperatures and pressures involved, a much darker and stronger flavor profile may be obtained.

More specifically, not only does the higher pressure gradient exerted on the coffee grounds allow for a more successful extraction due to the heavier coffee ground saturation with the heavier pressure gradient and stronger pressure wave, but there is also massive off-gassing of carbon dioxide as the coffee ground bed 1050 becomes more greatly compressed. As discussed above, the off-gassing of carbon dioxide may further cause the coffee ground bed 1050 to further hyper-compress. This may consequently result in an extensive conversion of energy into heat, with higher levels of thermal dynamics coming into play as the greater compression of the coffee grounds results in greater frictional heating and consequently higher solvent 1010c temperatures within the extraction column 1000c. Accordingly, a higher level of thermal dynamics results in generating heat at much higher solubilization and mas transfer levels as opposed to lower temperatures derived from lower pressures. As such, the greater generation of energy within the extraction column 1000c provided by a more intense pressure wave catalyzation sequence, results in greater conversion of friction, kinetic energy, and mechanical wave energy. All in all, the more intense pressure wave activity allows more volatiles, solids, and constituents to be extracted from the raw materials, but also, due to the much heavier temperatures and pressures that develop if, a bolder, stronger, and fuller flavor profile of the effluent extracted from the raw materials is the result.

As such, the pressure wave strength may be used and manipulated by the pressure gradient applied to the raw materials in order to help obtain a milder or bolder flavor profile from the extracted raw materials. In an example design provided below, a table elaborates the relationship of different pressures gradients and temperature ranges to obtain varied flavor profiles extracted from the raw materials, such as coffee beans by way of example only.

TABLE 1

The relationship of pressure and temperature to obtain different flavors from the coffee beans.

| Pressure Key | Temperature of Primary Pressure Wave (Fahrenheit) | Extraction Result | Flavor Description |
| --- | --- | --- | --- |
| 0-20 PSI | 105°-115° | Light Extraction | Very smooth profile, rich and sweet. |
| 20-40 PSI | 125°-140° | Moderate Extraction | Good balance of smoothness, yet rich and sweet. Subtle complexities add balance. |
| 40-70 PSI | 140°-160° | Full Extraction | Rich, full body, with well-rounded complexity. Full of sweet volatiles. |
| 70-90 PSI | 150°-170° | Heavy Extraction | Extremely rich and full bodied flavor. Contains very high amounts of solid and volatile aromatics. |
| 90-120 PSI | 165°-180° | Very Heavy Extraction | High in dark roasted solids. Contains volatile aromatics that yield smokiness and bite flavors. |
| 120-240 PSI | 177°-190° | Extremely Heavy Extraction | Darkest French roast profile that adds remarkable fullness with smoky edge and bite flavors. |

Temperature is the secondary internal energy-oriented driver, which can adversely or positively impact the catalyzing pressure wave cycle. Ambient temperature of the incoming flow of pressurized solvent is insufficient for extracting all the necessary compounds and constituents from the raw materials. However, while high temperatures may extract the necessary heat sensitive compounds and constituents, excessively high temperatures may be damaging and even destroy the extracted compounds and constituents, especially with extended residence times. As a result, the key to a successful and high quality extraction requires finding a desired thermal window where the extracted compounds and constituents are extracted, yet preserved.

Because the catalyzing pressure wave cycle releases thermal energy as the energy creators within the extraction column are catalyzed, it causes larger amounts of carbon dioxide to be released, which in turn becomes catalyzed energy to generate the necessary mechanical energy and thermal energy. As such, with each new catalyzing sequence, the catalyzing pressure wave cycle may up-regulate the solvent temperature within the extraction column. Moreover, the solvent entering the base of the extraction column may be at a lower temperature range when taking into consideration of the increase in solvent temperature with the occurrence of the catalyzing pressure wave cycle. Additionally, the application of specifically tailored temperature ranges may be used to obtain a particular flavor profile of the extracted effluent from the extracted raw materials. As such, manipulating the temperature of the incoming flow of pressurized solvent entering the extraction column may be utilized to control the catalyzing intensity of the catalyzing pressure wave cycle to obtain a desired flavor profile of the extraction outcome.

More specifically, by way of example only, applying 0-20 PSI is sufficient pressure to lightly drive the pressure wave in the catalyzing pressure wave cycle. The solvent selected to extract the raw materials, such as coffee beans, in the solid-liquid extraction process may be down modulated to a much cooler temperature than would ordinarily be used for the pressure wave. This may be purposefully done in order to prevent the extraction process from entering into the critical thermal zone also known as the solubilization and mass transfer window. As such, the temperature range of the incoming flow of pressurized solvent may range around ambient temperatures, with the primary pressure wave catalyzing it to approximately 105°-115° Fahrenheit. These temperatures are selected with the knowledge that the secondary pressure wave will spike temperatures an additional 20°-40° F. This allows for the extraction of a wide range of constituents at temperatures below the associated critical thermal zone window, which ranges between 196 degrees to 204 degrees Fahrenheit for coffee grounds. Because the temperature of the incoming flow of pressurized solvent is low, the solubilization and mass transfer window is not achieved even with the increase in solvent temperature with the application of the catalyzing pressure wave cycle. As a result, this milder pressure and temperature setting may lead to a more mild coffee brew, but with rich and sweet flavor notes present due to the gentle catalyzing cycle.

In another example, the incoming flow of solvent with 20-40 PSI allows for a more sufficient pressure wave activity since it will be able to extract more solids and volatile aromatics with greater pressure and higher temperature application. By way of example only, an inlet temperature range of approximately 85° F., will be catalyzed to approximately 125-140° F. by the primary pressure wave. This temperature selection basically corresponds with the incoming flow of pressurized solvent with a pressure range of 20-40 PSI. However, because 20-40 PSI is still not sufficiently strong enough to attain the critical thermal zone of the solubilization and mass transfer window for coffee beans with an inlet solvent temperature of 85° F., the inlet solvent temperature will be catalyzed to 125°-140° F. by the primary pressure wave. As a result, large groups of solids, compounds and volatile aromatics though still beneath the solubilization and mass transfer window are now extracted, especially considering the added temperature spike of 20-40° F. from the secondary pressure wave. As a result, many more heat sensitive solids compounds and constituents are extracted as compared to the first PSI selection. This mid-range selection of the constituency spectrum yields a bolder, yet very sweet, smooth, and rich coffee extract profile available if to be obtained.

In another example, applying and utilizing a stronger pressure range of 40-70 PSI activates and takes advantage of a stronger pressure wave cycle by taking full advantage of all heat sensitive compounds and its ability to upregulate the solvent to much higher temperatures. The temperatures of the solvent may be even upregulated to the temperature range within the solubilization and mass transfer window with the aid of the secondary catalyzing pressure wave cycle. In other words, the pressure of the incoming flow of solvent with 40-70 PSI, in combination with both primary and secondary pressure waves of the catalyzing pressure wave cycle upregulation, may allow sufficient thermal heating to be generated so that temperatures within the solubilization and mass transfer window may be achieved. By way of example only, an inlet temperature range of approximately 120° is then catalyzed to 140°-160° F. by the primary pressure wave, which may be effectively utilized with the pressure range of 40-70 PSI to generate sufficient up-regulated thermal heating to reach the necessary temperature range of the solubilization and mass transfer window when taking into consideration the added heat applied by the secondary pressure wave. As a result, an extraordinarily rich and full bodied coffee extracted where virtually all heat sensitive compounds are extracted at the peak of the bell curve. This combination yields a rich, bold well-rounded cup complexity retaining all the sweet notes in all the appropriate places, and may be reproduced each and every time when such a pressure gradient and temperature range is applied to the raw materials.

In another example, applying and utilizing a stronger pressure range of 70-90 PSI activates and takes advantage of an even stronger pressure wave cycle, by taking full advantage of heat sensitive compounds and the p-wave's ability to significantly upregulate the solvent to higher temperatures. The increase in solvent temperature may be well within the solubilization and mass transfer window. As a result, maintaining a pressure range of 70-90 PSI allows a very wide range of rich soluble solids, volatile aromatics, and complex constituents to be extracted. By way of example only, an inlet temperature range of 130°-140° F., subsequently catalyzed to 150°-170° F. by the primary pressure wave may be very effectively utilized with the pressure range of 40-70 PSI to generate such sufficient up-regulated thermal heating with the added benefit of the secondary pressure-wave. With the upregulated thermal heating, from both the primary and secondary catalyzing pressure wave cycles, the temperature range of the solubilization and mass transfer window may easily be achieved. As a result, an extremely aromatic, robust and full bodied coffee flavor emanates that contains very high amounts of solids, constituents and volatile aromatics when such a pressure gradient and temperature range is applied to the raw materials.

In the instance that a stronger pressure range of 90-120 PSI is achieved, the pressure gradient drives the pressure wave high into the solubilization and mass transfer window, which immediately allows virtually all of the volatile aromatics and constituents and compounds to be extracted from the raw material. By way of example only, an inlet temperature range of 140°-150° F., which may be catalyzed to approximately 165°-180° F. by the primary pressure wave, may be very effectively utilized with a pressure range of 90-120 PSI to generate such sufficient up-regulated thermal heating with the added benefit of the secondary pressure wave. With this combination, it is possible to reach temperature ranges at the upper end of the solubilization and mass transfer window with the application of the primary and secondary catalyzing pressure wave cycle. Because the pressure wave intensity is great and at its peak at the solubilization and mass transfer window, the flavor profile attained is similar to that of French Pressed coffee or an Americano. Thus, the flavor profile may be characterized as rich and dark, as most of the solids and volatile aromatics are extracted from the coffee beans higher in the temperature and pressure spectrum, further resulting in a much bolder, stronger, and fuller flavored profile extracted from the raw materials.

In another exemplary instance, the incoming flow of solvent may include a pressure range with 120-240 PSI, which may be the heaviest pressure range applied to the coffee grounds within the extraction column other than a specialty extractions. This range may also be known or referred to as the basso Profundo, especially because of the extremely dark roasted coffee flavor that is obtained at this pressure range with an application of an inlet temperature range of 150°-160° F. that is then catalyzed to 177°-190° F. by the primary pressure wave. Because of the greater pressures used, and the exceptionally high temperature application introduced by the secondary pressure wave, it results in a very strong fullness and bite with a pronounced dark, espresso-like smoky edged flavor in the extracted coffee from the coffee beans. Again, this strong and pronounced flavor profile emanating at the higher end of the temperature and pressure gradient results in a very intense pressure wave that allows more volatiles, solids, and constituents to be hydrolyzed then extracted from the raw materials at the very highest end of solubilization and mass transfer temperature window. As a result, a significantly bolder, stronger, and fuller Turkish-like flavor profile from the raw materials is extracted.

However, it should be noted that the provided table 1 only represents one particular set of pressure ranges and temperatures in accordance with a corresponding flavor profile. Indeed, it should be highlighted that Table 1 is only a generalized guide where an almost limitless number of variations may be used based on a particular desired flavor outcome and intensity.

Also vital to the quality and flavor of the effluent extracted during the extraction process is the size, shape, and packing of the raw material grinds within the extraction column. FIG. 11A illustrates a grind sample of coffee grind particles 1100A under magnification that fails to form a poly-grain grind matrix, while in stark contrast, FIG. 12A illustrates a grind sample of coffee grind particles 1200A under magnification that successfully forms a poly-grain grind matrix. As such, aspects of FIGS. 11 and 12 will be compared and described together.

As illustrated in FIG. 12A, the poly-grain grind matrix of raw materials, or in this case, coffee grind particles 1200A, is a matrix of specifically sized particle sizes that form a network as the particles nest against each other. This occurs when the coffee grind particles 1200A are not necessarily perfectly uniform, but rather uniform enough and consist of a selected group of specially chosen particle sizes. By way of example only, the different weight ranges for the coffee grind particle 1200A sizes may be achieved only by breaking down the particles by distinct weight classifications within each appropriate sieve size. The different sized coffee grind particles 1200A may then be combined to form the poly-grain grind matrix as the coffee grind particles 1200A are now able to nest and interlock with one another when packed into an extraction column. By way of example only, the coffee beans may be ground to achieve the selected particle sizes by selectively placing the coffee beans in a high quality multi-head burr-granulizer or roller mill. This allows the coffee grind particles 1200A to achieve the particular grind consistency, uniformity, profile and accuracy so that distinct particle sizes may be obtained and then combined to properly form a poly-grain grind matrix. By further way of example only, the poly-grain grind matrix may consist of coffee grind particles 1200A with sizes that range from the use of as few as 2 sieves and as many as 7, which may depend on the desired outcome from the distinct and varied particle sizes.

More specifically, the poly-grain grind matrix is a network or sequence of grind sizes that partially interlock like gears. This gear-like formation effectively closes most, but not all, of the interstitial spacing and low resistance travel ways within the packed coffee grounds. Such a network formation of coffee grind particles 1200A may be called a "quasi-fit" because the varied sizes of the coffee grind particles 1200A are designed to sit against one another such that a good degree of interstitial spacing within the coffee grind particles 1200A is eliminated, but not all. Because interstitial spacing is still not wholly eliminated, the poly-grain grind matrix still allows room for the wetted coffee grinds to swell when thermal heat from the pressure wave is generated. Thus, when the coffee grinds swell, the interstitial spacing within the coffee grind particles 1200A further decrease, without completely closing, causing necessary resistance and back pressure to form within the extraction column during the pressure wave sequence. As such, the poly-grain grind matrix of the coffee grind particles 1200A allows for a tighter compression ratio, greater frictional heating, enhanced penetration of the coffee grounds, and minimizes the potential occurrence of solvent channeling or center holing within the coffee grounds. The poly-grain grind matrix thus effectively helps coordinate the strength, intensity, and duration of the pressure wave sequence of the extraction process.

As such, the poly-grain matrix is designed to work in conjunction with the catalyzing ability of the pressure-wave within the extraction column. Because the poly-grain grind matrix has the capability to sufficiently close off most, but not all of interstitial spacing, the necessary resistance and backpressure within the extraction column is maintained to achieve the proper catalyzing pressure wave cycle. As the coffee grounds become further hydraulically compressed with the increased resistance and backpressure within the poly-grain grind matrix, frictional forces from the compressed coffee grounds provide the necessary catalyst to generate sufficient bursts of extraordinary thermal energy from the secondary pressure wave to reach solubilization and mass transfer temperatures, and thereby further extract the necessary compounds and constituents from the raw materials. Therefore, the poly-grain grind matrix may aid in providing the necessary catalyzing energy to begin the pressure wave sequence, which includes the secondary pressure wave sequence with the skip trigger event and water hammer effect, as discussed in greater detail above with respect to FIGS. 5 and 6. Because the poly-grain matrix may aid in bringing about the necessary conditions for thermal energy to be released from the compressed coffee grind particles 1200B, the poly-grain grind matrix may further aid in up-regulating the solvent temperature within the extraction column as the pressure wave sequence continues to generate more energy in the form of heat. As such, the solubilization and mass transfer temperature range of 196° to 204° Fahrenheit may be achieved with the aid of the poly-grain grind matrix so that all of the volatiles, solids, and constituents of the raw materials are extracted during the extraction process.

Furthermore, a very important aspect of the poly-grain grind matrix is that it may also be designed to leave a predictable and calculable compressibility effect of the compressed coffee grounds. By way of example only, the poly-grain grind matrix may result in the predictable compressibility of the coffee grind particles 1200A to decrease with the square of the distance from the point of pressure or point of hydraulic impact. As such, this means that the coffee grounds closest to the boundary layer is the area with the most compression and then decreases up the extraction column with the square of the distance from the boundary layer. Or, the compression may decrease with the square of the distance down the column when being hand packed and tamped when loading the coffee into the extraction vessel prior to extraction. Because the poly-grain grind matrix provides predictable and calculable compressibility not found with regularly ground particles, it allows for the necessary calculation, and resultant predictability for consistent quality and extraction results.

Additionally, the coffee grind particles 1200A in the poly-grain grind matrix may cause the matrix to act or behave as its own filtering agent. In other words, the poly-grain grind matrix filters the effluent passing through the poly-grain grind matrix so that any coffee grounds and any small or microscopic non-soluble sediment mixed with the effluent is trapped within poly-grain grind matrix and further separated from the effluent. As such, when the effluent is extracted from the coffee grounds, the effluent may proceed to travel through the small, but remaining interstitial spacing within the poly-grain grind matrix. Because the interstitial spacing may be so small towards the completion of the extraction process, such as an interstitial spacing of 1 micrometer or less byway of example only, the non-soluble sedimentary coffee grind particles 1200A are not able to travel through the interstitial spacing and are trapped.

Because the interstitial spacing may be as small as one micrometer or less, the poly-grain grind matrix may capture a range from 99.9% to 99.999% of all of the non-soluble particles or sediment combined with the effluent. In other instances, as the extraction proceeds and the porosity of the interstitial spacing loads up with successively smaller and smaller particle sizes, the poly-grain grind matrix may capture a range from 99.99 to 99.999% of all the non-soluble particles or sediments combined with the effluent. Therefore, the poly-grain grind matrix may be designed to provide sufficient interstitial spacing to allow effluent to flow through while also simultaneously trapping the coffee grind particles 1200A and even capture the non-soluble sediment bleed-out as the effectively smaller and smaller interstitial spacing acts as a barrier or filtering agent to the coffee grind particles 1200A.

FIG. 11A illustrates a grind sample of raw materials, such as coffee grind particles 1100A, under magnification that have been ground using commercial use grinders. With regards to FIG. 11A, because the coffee grind particles 1100A have been ground using standard commercial grinders, the coffee grind particles 1100A are virtually ground in every possible size without any consideration of size, consistency, or structure. As such, the size of each coffee grind particle 1100A may range from microscopic dust particles to very large particles that are clearly visible to the human eye and every considerable size in between. Because of such vast incongruities and inconsistencies between the size of each coffee grind particles 1100A, the individual coffee grind particles 1100A fail to sit together evenly, resulting in the presence of a much wider interstitial spacing in comparison to the poly-grain grind matrix as illustrated in FIG. 12A. As a result, coffee grind particles 1100A fail to form a network of particles that nest against each other three dimensionally, which allows the solvent to travel through channels and points of least resistance within the packed raw materials in virtually any direction. Furthermore, because the abject looseness of the coffee grounds, the solvent seeks the point of least resistance around the grounds, and fails to effectively penetrate into all of the coffee grounds within the extraction column. As a result, when the solvent only follows the areas of least resistance, a superficial and ineffective extraction process results.

Furthermore, this is highlighted in FIG. 11B, which illustrates the coffee grind particles 1100B under hydraulic compression. As illustrated, the coffee grounds 1100B fail to effectively sit together so that wide interstitial spacing is prominently present even when the coffee grounds 1100A are under hydraulic compression. Because the interstitial spaces remain widely open, the solvent further fails to effectively penetrate through the coffee grounds 1100A as the solvent instead flows through the channels formed within the interstitial spaces.

In stark contrast, FIG. 12B illustrates a grind sample of coffee grind particles 1200B depicting a poly-grain grind matrix under hydraulic pressure. As illustrated, the coffee grind particles 1200B have particles where the edges fit together like gears. However, as further illustrated, just as when gears are fitted together and still allow a certain degree of spacing tolerance on either side, such characteristic qualities are also true with the poly grain matrix, even after the hydraulic compression of the coffee grind particles 1200B. This still allows for the frictional heating and room for the swelling of the coffee grounds. By way of example only, the interstitial spacing remaining even after hydraulic compression may be in the range from one micrometer. Without some amount of interstitial space remaining, hydraulic compression from the application of the pressure wave cycle would compress the coffee grind particles 1200B such that absolutely no water or effluent can pass through, regardless of the amount of pressure applied. This event, otherwise known as deadheading, would essentially create an impassable block of cement-like material and completely halt the extraction process. When a small degree of spacing is allowed, as the effluent passes through the interstitial spacing of the compressed coffee grounds, any non-soluble coffee grind particles 1200B combined with the effluent will become trapped within the poly-grain grind matrix, while the effluent still passes through, since the non-soluble coffee grind particles 1200B are simply too large to travel through the micron sized interstitial spacing.

Also vital to the quality and flavor of the effluent extracted during the extraction process is the solvent utilized to extract the necessary aromatic compounds and constituents from the raw materials, such as coffee grounds by way of example only. FIG. 13 illustrates a water treatment system 1300 to restructure solvent to be utilized with the extraction process, consistent with embodiments disclosed herein.

The solvent utilized in the extraction process may be restructured so that the restructured solvent not only aids in extracting all the necessary aromatic compounds and constituents from the raw materials, but also aids the extraction process so that the need to utilize excessive heat to extract the necessary compounds is eliminated. As disused above, prolonged exposure to high temperatures may result in the degrading or destruction of extracted heat sensitive compounds from the raw materials, which often results in a bitter, burnt, and unpleasant flavor profile of the extracted effluent.

By way of example only, a selected solvent from the extraction process, such as water, may be reconstructed by electrodeionization. Electrodeionization is a water treatment process that does not use chemical treatments such as acid or caustic soda. Instead, electrodeionization utilizes electricity and ion exchange membranes to deionize and separate the dissolved ions from the solvent, such as water. Water is passed between a positive electrode and a negative electrode where the semipermeable ion-exchange membranes then further separate the positive and negative ions to create deionized water.

Because electrodeionization creates an imbalance of ions in the newly formed deionized water, the deionized water is now unstable as it actively tries to equalize its imbalance of ions in any way possible. As such, when de-ionized water comes in contact with raw materials, the de-ionized water may even physically remove and draw out the compounds and constituents from the raw materials in an attempt to restore the balance of ions. Therefore, many of the difficult to obtain solids and constituents within the raw materials may be extracted with the use of deionized water, leading to a more efficient and reliable extraction process.

The level of ionic purity within the deionized water may be controlled so that an ionic purity range between 0-18.2 m$\Omega$ is used to extract the raw materials during the extraction process. The ionic purity of the deionized water may be tuned or adjusted depending on the type of the raw materials and desired extraction to be executed. In some embodiments, 18.2 m$\Omega$ may be the highest level of ionic purity obtained for extracting raw materials. While an ionic purity of 18.2 m$\Omega$ may lead to very aggressive solvent allowing many, if not all, of the compounds and constituents to be extracted from the raw materials, it should be noted that there may be a point of diminishing returns when using such high ionic purity levels. This is because building and maintaining such aggressive solvent may become an issue in trying to contain and regulate the solvent at such high levels, especially considering how unstable the deionized water is at 18.2 mΩ. Furthermore, utilizing solvent at 7-11 mΩ may well be sufficient to extract the necessary compounds and constituents from the raw materials as well as, or nearly as well as solvent with an ionic purity of 18.2 mΩ.

As a result, the extraction process may be significantly synergistically enhanced with the application of both deionized water and the catalyzing pressure wave cycle. For example, during the pressure wave sequence, the catalyzing energy creators formed within the extraction column 1320 results in the skip trigger event leading to the water hammer affect, as discussed in detail above. When the boundary layer of the coffee grounds jump upward and stops when it reengages with the sides of the extraction column, the solvent underneath continues to move upward and slams into the halted raw materials.

Additionally, the driving and carrying capacity for various solvents used in the extraction column are highlighted in FIGS. 14*a-c*. As indicated above, the solvent plays a key role in the extraction process and with the catalyzing pressure wave, especially since the selected solvent must be able to effectively penetrate deep into the raw materials where the space in between the interstitial spaces may be as small as one micrometer or less. Clearly, non-deionized solvent does not have a characteristic quality to effectively travel and penetrate into such small areas, which is evidence by its failure to generate the necessary catalyzing energy creators within the extraction column.

Furthermore, as illustrated in FIGS. 14*a* and 14*b*, the solvent may be standard city tap water 1405*a* or filtered city water 1405*b* configured to pass through the coffee grounds 1410. Because standard city tap water 1405*a* and filtered city water 1405*b* are both non-deionized solvents, a weak extraction occurs, as indicated by the light color shading of the extracted effluents 1415*a* and 1415*b*. A weak extraction occurs because standard city tap water 1405*a* and filtered city water 1405*b* are stable solvents and do not characteristically seek to re-stabilize itself by stripping away ions or extractable particles from the raw materials, as is the case with deionized solvents. As such, without the necessary restructured solvent, the catalyzing pressure wave will fail to form and result in a weak extraction of the raw materials.

However, as illustrated in FIG. 14*c*, when using deionized solvent 1405*c* to extract the raw materials from the coffee grounds 1410, an efficient extraction occurs such that most, if not all, of the aromatic compounds and constituents are extracted, as indicated by the darker shading of the extracted effluent 1415*c*. This stark contrast, with respect to using standard city tap water 1405*a* or filtered city water 1405*b*, highlights that deionized solvent has a very high carrying capacity due to its characteristic quality of being very unstable, thus allowing the deionized solvent to drive deep into the coffee grounds 1410 as it actively seeks to stabilize itself by stripping away the ions and extractable particles from the raw materials.

More specifically, due to the change in solvent structure of the deionized solvent 1405*c*, the hyper-aggressive solvent is driven deeper into the coffee grounds 1410. Moreover, the lack of ionicity means a much heavier carrying capacity for the solvent. As such, the selected solvent plays a key role in the extraction process and with the catalyzing pressure wave, especially since the solvent must be able to effectively penetrate deep into the raw materials through the very low porosity of the coffee grounds 1410 within the poly-grain grind matrix. Moreover, because deionized solvent 1405*c* seeks to actively stabilize itself by stripping ions wherever it can find them, it has the capacity to drive deep into the coffee grounds 1410 like a knife, by leaching and stripping-out all of the compounds, constituents and volatiles as the solvent seeks towards the path of re-stabilization. After fully loading its carrying capacity, the deionized solvent 1405*c* can still slip through very small pore-like interstitial spaces within the packed coffee grounds 1410, especially when the water hammer effect drives the restructured solvent deep into the raw materials and when compression is greatest.

In addition, the deionized solvent 1405*c* further aids in releasing enormous amounts of carbon. As the thermally heated carbon dioxide gasses-off and expands, the carbon dioxide compresses the surrounding grounds in all directions as lateral compression vectors create stronger coefficient of friction against the walls of the extraction column. As a result, stronger resistance, backpressure, and higher static friction continues to build in the reactive layer and boundary layer, which heats up the areas near the reactive layer to further generate a secondary expansion of the gases, and then compresses coffee grounds 1410 even further. In turn, this generates higher coefficients of friction against the side of the extraction column, which then further generates higher levels of potential energy in the solvent well with increasing hydraulic pressure. This continuous succession of increasing energy assures higher hydraulic pressure with each successive cycle, which in turn breaks the stronger coefficients of friction, and ultimately unleashes a stronger secondary pressure wave for the next cycle. This repetitive pattern of increasing energy each time guarantees that the next pressure wave cycle will always be stronger than the last until a plateau pressure is reached, as explained above in detail. Only the highest energy levels catalyzed by the pressure wave sequence will trigger and maintain the energy building and self-perpetuating catalyzing pressure wave cycle. Ordinary water, such as standard city tap water 1405*a* or filtered city water 1405*b*, simply does not have the capacity to catalyze the required amount of energy necessary for this disclosed extraction process, and nor does it have any carrying capacity to carry off the solids, compounds and constituents once the coffee grounds 1410 are extracted. As such, the restructured solvent is integral in aiding the pressure wave sequence so that the catalyzing energy creators are formed within the extraction column to execute an efficient and effective extraction process.

Referring back to FIG. 13, the water treatment system 1300 includes a connector feed 1301 that directs solvent to be used for the extraction process to the water treatment system 1300. By way of example only, the solvent used may be water, which is the most universal and efficient solvent. The water may be sourced from a water treatment center, city water line, or a water tank. In some embodiments, the connector feed 1301 may direct water that is pressurized, where the pressure range may be from 10-240 PSI depending on the source and the requirements for use.

Once the water flows through the connector 1301, the water may enter the stage media filtration 1302, which is a pre-filter system that consists of a sediment filter and a carbon filter to partially clean the water prior to entering the reverse osmosis device 1304. As the water proceeds past the stage media filtration 1302, the reverse osmosis device 1304 removes most of the total dissolved solids, which prepares the water to be restructured by electrodeionization.

As the water proceeds past the reverse osmosis device 1304, the water may enter the electrodeionization system 1306 to reconstruct the water within the range of 0-18.2 mΩ, as discussed above in detail. The ionic purity of water can be tuned or adjusted as desired, which may depend on the type of raw material to be extracted and as well the type of flavor profile desired.

Next, the now reconstructed solvent may proceed to flow through the filtration pod 1310, which may be configured to include a total of 3 individual filters within the filtration pod 1310. The first filter of the filtration pod 1310 may include an activated carbon filter, which by example only, is paired with a 0.5 micron filter. The first filter may be configured to remove any contaminants and any off flavors that may have resulted from passing through the stage medial filtration 1302. The second filter of the filtration pod 1310 may include a 0.45 micron nominal filter to catch any microscopic particulate matter that is just at or above the size of most bacteria. The third filter of the filtration pod 1310 may include a 0.2 micron sterilizing filter, which is a pharmaceutical grade final filter most often used to fully sterilize the contents within the solvent. As such, the filtration pod 1310 is a thorough filtration system that eliminates most, if not all of the potential contaminants and bacteria within the water.

Next, the water may flow through a ultraviolet light 1308, which acts as a failsafe, and further ensures that the water flowing through the water treatment system 1300 is absolutely sterile and pure. As the water passes through the ultraviolet light 1308, the water may then proceed to flow through the heat exchanger 1312, which may be able to precisely adjust the water temperature before the solvent enters the extraction column 1320. The heat exchanger 1312 may effectively cool or heat the solvent or water to the desired temperature based on the desired flavor profile and intensity of the extracted effluent, as further described in Table 1.

The water may then proceed to flow through the a gear pump 1314 to ensure that a pre-determined pressure is applied to the solvent before it enters the extraction column 1320. As such, a desired pressure gradient and flow differential is able to be transmitted into the extraction column 1320 based on the manipulation of pressure via the gear pump 1314. Because the pressure wave sequence is highly responsive to the pressure gradient and flow differential, the gear pump 1314 plays a vital role in ensuring that a desired pressure wave is generated and applied within the extraction column, as further described in Table 1 with regards to the pressure of the solvent. Additionally, the gear pump 1314 may also determine when the catalyzing pressure wave cycle plateaus. For example, the catalyzing pressure wave cycle may plateau when the hydraulic pressure at the boundary layer and the reactive layer of the raw materials in the extraction column 1320 reaches or equals the pressure as selected on the gear pump 1314. As such, the gear pump 1314 may regulate the pressure contained within the extraction column 1320 so as to control and manipulate the catalyzing pressure wave cycle.

To monitor the volume, flow rate, and pressure applied within the extraction column 1320, a universal flow meter 1316 may be incorporated into the water treatment system 1300. The universal flow meter 1316 may monitor the volume, flow-rate, and pressure applied within the extraction column 1320, so that the monitoring and any fine-tuning required may be easily determined and performed. As the water enters the extraction 1320, the extraction process may take place. The effluent extracted from the raw materials may then exit the extraction column 1320 and be collected in the jacketed catch tank 1322. The jacketed catch tank 1322 may also further cool the effluent between 25° F.-50° F. to preserve the delicate compounds and constituents extracted within the extraction column 1320.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of extracting a compound from a raw material using an extraction column comprising:
    directing a flow of pressurized solvent into a base of the extraction column;
    utilizing the flow of pressurized solvent to create a pressure gradient applied to the raw materials packed within the extraction column;
    compressing the raw materials via hydraulic compression from the pressurized solvent; and
    obtaining an extracted effluent from the compressed raw materials that flows out of the extraction column;
    wherein the extraction column is sealed off by a removable pressure cap, the removable pressure cap configured to cover the extraction column when utilizing the flow of pressurized solvent.

2. The method of claim 1, further comprising raising a temperature of the pressurized solvent within the extraction column due to frictional heating generated from compressing the raw materials.

3. The method of claim 1, further comprising drawing out all of the volatile and aromatic heat sensitive compounds from the raw materials.

4. The method of claim 3, wherein drawing out all of the volatile and aromatic heat sensitive compounds comprises achieving a critical thermal zone within the extraction column, such that the raw materials become fully saturated with the pressurized solvent.

5. The method of claim 4, wherein the critical thermal zone is a range from 196 degrees to 204 degrees Fahrenheit.

6. The method of claim 4, wherein the critical thermal zone is present within a boundary layer of the compressed raw materials.

7. The method of claim 1, wherein the hydraulic compression of the raw materials forces the raw materials closer together to eliminate excess interstitial spaces and low resistance migration travel ways, such that the compressed raw materials move closer and upward within the extraction column.

8. The method of claim 1, wherein compressing the raw materials causes off-gassing and expansion of thermally heated carbon dioxide, such that the raw materials are further compressed.

9. The method of claim 1, wherein off-gassing of carbon dioxide results in generating greater thermal heating as a result of further compressing the raw materials closer due to the expanding carbon dioxide.

10. A method of extracting a compound from a raw material using an extraction column comprising:
    directing a flow of pressurized solvent into a base of the extraction column;
    utilizing the flow of pressurized solvent to create a pressure gradient applied to the raw materials packed within the extraction column;
    compressing the raw materials via hydraulic compression from the pressurized solvent; and
    obtaining an extracted effluent from the compressed raw materials that remains within the extraction column;
    wherein the extraction column is sealed off by a removable pressure cap, the removable pressure cap configured to cover the extraction column when utilizing the flow of pressurized solvent.

* * * * *